US011422264B2

(12) United States Patent
Mihankhah et al.

(10) Patent No.: US 11,422,264 B2
(45) Date of Patent: Aug. 23, 2022

(54) OPTICAL REMOTE SENSING

(71) Applicant: NANYANG TECHNOLOGICAL UNIVERSITY, Singapore (SG)

(72) Inventors: Ehsan Mihankhah, Singapore (SG); Danwei Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 17/611,048

(22) PCT Filed: May 14, 2020

(86) PCT No.: PCT/SG2020/050281
§ 371 (c)(1),
(2) Date: Nov. 12, 2021

(87) PCT Pub. No.: WO2020/231340
PCT Pub. Date: Nov. 19, 2020

(65) Prior Publication Data
US 2022/0146681 A1    May 12, 2022

(30) Foreign Application Priority Data

May 14, 2019   (SG) ............................. 10201904334Y

(51) Int. Cl.
*G01S 17/00*   (2020.01)
*G01S 17/89*   (2020.01)
*G01S 7/481*   (2006.01)

(52) U.S. Cl.
CPC ............ *G01S 17/89* (2013.01); *G01S 7/4814* (2013.01); *G01S 7/4816* (2013.01); *G01S 7/4817* (2013.01); *G01S 7/4818* (2013.01)

(58) Field of Classification Search
USPC ....................................................... 356/4.01
See application file for complete search history.

(56) References Cited

U.S. PATENT DOCUMENTS 8,294,879 B2 * 10/2012 Silny ....................... G01S 17/42
356/3.01
10,408,940 B2 * 9/2019 O'Keeffe ................ G01S 17/89
(Continued)

FOREIGN PATENT DOCUMENTS

CN           104698468 A     6/2015
DE    10 2017 124 633 A1    4/2019
(Continued)

OTHER PUBLICATIONS

Amann et al., "Laser ranging: a critical review of usual techniques for distance measurement," *Opt. Eng.* 40(1):10-19, Jan. 2001.
(Continued)

*Primary Examiner* — James R Hulka
(74) *Attorney, Agent, or Firm* — Seed Intellectual Property Law Group LLP

(57) ABSTRACT

There is provided an optical remote sensing system including: an emission channel mount having mounted thereto input ends of an array of emission fiber channels; a beam steering device configured to scan a light beam from a light source across the input ends of the array of emission fiber channels; a plurality of sensor portions, each sensor portion configured to be exposed to a corresponding scene and having connected thereto: an output end of a corresponding emission fiber channel of the array of emission fiber channels; and an input end of a corresponding first collection fiber channel of an array of first collection fiber channels; a first photodetector arranged to detect the backscattered light beams that propagated through the array of first collection fiber channels for sensing a property with respect to the corresponding scenes associated with the plurality of sensor portions; and a fiber channel hub configured for the array of emission fiber channels and the array of first collection fiber channels to pass through. There are also provided corresponding methods of optical remote sensing and a corre- (Continued)

sponding method of forming the optical remote sensing system.

20 Claims, 15 Drawing Sheets

(56) References Cited

U.S. PATENT DOCUMENTS

| | | | |
|---|---|---|---|
| 10,564,266 B2* | 2/2020 | O'Keeffe | G01S 7/4817 |
| 2012/0120382 A1 | 5/2012 | Silny et al. | |
| 2018/0100929 A1 | 4/2018 | O'Keeffe | |
| 2018/0284283 A1 | 10/2018 | Boucourt et al. | |
| 2019/0025412 A1* | 1/2019 | O'Keeffe | G01S 17/10 |
| 2019/0391243 A1 | 12/2019 | Nicolaescu | |

FOREIGN PATENT DOCUMENTS

| | | | | |
|---|---|---|---|---|
| EP | 2 833 161 A1 | 2/2015 | | |
| EP | 3 428 678 A1 | 1/2019 | | |
| WO | WO-2009021079 A1 * | 2/2009 | | A61B 1/00163 |
| WO | 2018/128655 A2 | 7/2018 | | |

OTHER PUBLICATIONS

Brockmeyer et al., "Papillon: Expressive Eyes for Interactive Characters," *ACM SIGGRAPH 2013 Emerging Technologies*, 2013, 1 page.
Heshmat et al., "Optical brush: Imaging through permuted probes," *Scientific Reports*, 6:20217, published Feb. 12, 2016, 9 pages.
Hu et al., "Registration of Image and 3D LIDAR Data from Extrinsic Calibration," *The 3$^{rd}$ International Conference on Transportation Information and Safety*, Jun. 25-28, 2015, Wuhan, China, pp. 102-106.
Mastin et al., "Automatic Registration of LIDAR and Optical Images of Urban Scenes," *IEEE Conference on Computer Vision and Pattern Recognition*, 2009, pp. 2639-2646.
McCarthy et al., "Kilometer-range, high resolution depth imaging via 1560 nm wavelength single-photon detection," *Optic Express* 21(7), Apr. 8, 2013, 12 pages.
Mihankhah et al., "Environment Characterization Using Laplace Eigenvalues," *14$^{th}$ International Conference on Control, Automation, Robotics and Vision (ICARCV)*, 2016, pp. 1-6.
Mihankhah et al., "Avoiding to Face the Challenges of Visual Place Recognition," *Intelligent Systems Conference 2018*, Sep. 6-7, 2018, London, UK, pp. 1-6.
Mihankhah et al., "Identification of Zones and Snapshots Through Sequence Analysis," SG Patent Application No. 10201900929R, filed Jan. 31, 2019, 1 page. (Abstract Only).

* cited by examiner

|  | Basic Camera | Stereo Camera | Multiple (N>2) cameras | Mechanical 2D LiDAR | Mechanical 3D LiDAR | 3D LiDAR | RGB Flash LiDAR | Camera + LiDAR | Solid state LiDAR |
|---|---|---|---|---|---|---|---|---|---|
| Limitation of Field of view | X | X |  | X (along altitude) | X (along altitude) |  | X | X | X |
| Sensitivity to Lighting Condition | X | X | X |  |  |  |  |  |  |
| Limitation of Depth of field | X | X | X |  |  |  |  | X |  |
| Bulky |  |  | X |  | X | X |  | X |  |
| Non uniform |  |  |  |  |  | X |  |  |  |
| Distortion | X | X | X |  |  |  |  | X |  |
| Lack of depth information | X |  |  |  |  |  |  |  |  |
| Causing vibration |  |  |  | X | X | X |  |  |  |
| Limited lifetime |  |  |  | X | X | X |  |  |  |
| Scan rate |  |  |  |  |  | X |  |  |  |
| Flashing visible light |  |  |  |  |  |  | X |  |  |
| Expensive |  |  | X |  | X | X |  | X |  |
| Eye Safety concerns |  |  |  |  |  |  |  |  | X (close to the sensor) |
| Limited resolution |  |  |  |  |  |  |  |  | X (phased array technique) |
| Lack of color |  |  |  | X | X |  |  |  | X |

FIG. 4

|  | Planar 2D LIDAR | Multi plane LIDAR | 3D LIDAR | Solid state LIDAR | LIDAR through fiber optic probe |
|---|---|---|---|---|---|
| Limitation of the field of view | No Altitude Coverage ☒ | Limited coverage across Altitude ☒ | Unlimited | Limited both across Altitude and Azimuth axes ☒ | Unlimited |
| Point cloud density | Uniform | Non-Uniform ☒ | Uniform | Uniform | Uniform |
| Scan rate | Real time | Real time | Very slow ☒ | Real time | Real time |

FIG. 10

OPTICAL REMOTE SENSING

CROSS-REFERENCE TO RELATED APPLICATION

This application claims the benefit of priority of Singapore Patent Application No. 10201904334Y, filed on 14 May 2019, the content of which being hereby incorporated by reference in its entirety for all purposes.

TECHNICAL FIELD

The present invention generally relates to optical remote sensing, and more particularly, to an optical remote sensing system, a method of optical remote sensing, and a method of forming the optical remote sensing system.

BACKGROUND

Remote sensing relates to a technique of capturing a property (which may also be referred to as an attribute or a charactertistic) of a scene, such as a property of an object in the scene or a property of an environment in the scene, without physical contact. There are generally two categories of remote sensing, namely, active remote sensing and passive remote sensing. For example, colour camera (e.g., RBG camera) is a well-known device for passive remote sensing of the color information of a scene, which is visible through the limited field-of-view (FoV) of the camera lens. In general, to obtain the colour information, light reflected from a surface of an object, within the eye-visible wavelength range, is sensed by the Charge-Coupled Device (CCD) or Complementary Metal-Oxide-Semiconductor (CMOS) sensor of the camera. On the other hand, Light Detection And Ranging (LiDAR) is an example of an active remote sensing device, which measures the distance of an object. In general, a light beam is emitted by a LiDAR device towards an object, and a backscattered light beam from the object is captured by a sensor of the device. The Time-of-Flight (ToF) of the light beam (e.g., from the light beam being emitted to the backscattered light beam being received) may then be used to determine or estimate the distance of the object from the device.

Active and passive remote sensing devices are vastly used in different applications. The range of distances for the studied phenomena can be very short (e.g., microscopes) or very far (e.g., telescopes). In addition, the measured properties may be very different according to the remote sensing objective(s). Examples of types of properties which can be optically measured include color, distance, temperature, roughness, vibration, and so on. These sensors may also be referred to as the visual perception sensors.

Most visual perception devices measure one optical property of an object or a medium with the assumption that the object or medium is confined within a limited volume, and so it can be observed through a limited FoV. For example, the color, temperature or distance of a person, a planet or a microscopic sample may be studied by pointing the sensing device, from a specific observation point, towards the object. For example, the FoV (e.g., changing the position of the lens) may be adjusted in such a way that the studied phenomena fall within the sensing scope (FoV and depth of field) of the sensing device. In this situation, the sensing device "looks at" the studied phenomena from an "external observation point". However, there are specific applications in which the spatial dimension of the studied phenomena is not limited. Therefore, in these applications, it is not possible to direct the sensing device towards the studied phenomena. An example of such a situation is the study of the visual properties of objects located in an entire surrounding scene (or entire space) around a moving vehicle. From the perspective of the moving vehicle, the surrounding environment around the moving vehicle is an unknown set of objects located across the entire FoV around the vehicle. In this case, the sensing device cannot be oriented from an observation point towards any particular direction to completely sense the surrounding environment since the studied phenomena is stretched across the entire surrounding of the observation point. In this case, the sensor is required to look from the internal observation point, through the entire FoV, to sense the studied phenomena. This is only one example to illustrate a need for visual sensing across an entire FoV.

A need therefore exists to provide an optical remote sensing system and a method of optical remote sensing that seek to overcome, or at least ameliorate, one or more deficiencies associated with conventional optical remote sensing systems and methods, such as but not limited to, enhancing FoV capability, or additionally, enabling the capture of multiple properties (i.e., multiple types of properties) of a scene, in an efficient and/or effective manner.

SUMMARY

According to a first aspect of the present invention, there is provided an optical remote sensing system comprising:

an emission channel mount having mounted thereto input ends of an array of emission fiber channels;

a beam steering device configured to scan a light beam from a light source across the input ends of the array of emission fiber channels mounted to the emission channel mount;

a plurality of sensor portions, each sensor portion configured to be exposed to a corresponding scene and having connected thereto:

an output end of a corresponding emission fiber channel of the array of emission fiber channels, the output end being configured to emit the light beam that propagated through the corresponding emission fiber channel towards the corresponding scene; and an input end of a corresponding first collection fiber channel of an array of first collection fiber channels, the input end being configured to receive a backscattered light beam with respect to the corresponding scene based on the emitted light beam from the output end of the corresponding emission fiber channel;

a first photodetector arranged to detect the backscattered light beams that propagated through the array of first collection fiber channels for sensing a property with respect to the corresponding scenes associated with the plurality of sensor portions; and a fiber channel hub configured for the array of emission fiber channels and the array of first collection fiber channels to pass through, wherein a length of the array of first collection fiber channels located between the fiber channel hub and the first photodetector is bundled to form a first collection fiber channel bundle.

According to a second aspect of the present invention, there is provided a method of optical remote sensing, using the optical remote sensing system according to the above-mentioned first aspect of the present invention, the method comprising:

scanning, by the beam steering device, a light beam from the light source across the input ends of the array of emission fiber channels mounted to the emission channel mount;

emitting, from the output ends of the array of emission fiber channels, the light beams that propagated through the array of emission fiber channels toward the corresponding scenes, respectively;

receiving, via the input ends of the array of first collection fibers, backscattered light beams with respect to the corresponding scenes based on the emitted light beams from the output ends of the array of emission fiber channels, respectively; and detecting, by the first photodetector, the backscattered light beams that propagated through the array of first collection fiber channels for sensing a property with respect to the corresponding scenes associated with the plurality of sensor portions.

According to a third aspect of the present invention, there is provided a method of optical remote sensing, using the optical remote sensing system according to the above-mentioned first aspect of the present invention, the method comprising:

scanning, by the beam steering device, a light beam from the light source across the input ends of the array of emission fiber channels mounted to the emission channel mount;

emitting, from the output ends of the array of emission fiber channels, the light beams that propagated through the array of emission fiber channels toward the corresponding scenes, respectively;

receiving, via the input ends of the array of first collection fiber channels, backscattered light beams with respect to the corresponding scenes based on the emitted light beams from the output ends of the array of emission fiber channels, respectively;

detecting, by the first photodetector, the backscattered light beams that propagated through the array of first collection fiber channels for sensing a property with respect to the corresponding scenes associated with the plurality of sensor portions;

receiving, via the input ends of said each array of third collection fiber channels, reflected or radiated light beams with respect to the corresponding scenes; and detecting, by the third photodetector, the reflected or radiated light beams that propagated through the corresponding array of third collection fiber channels for sensing a corresponding additional property with respect to the corresponding scenes associated with the plurality of sensor portions.

According to a fourth aspect of the present invention, there is provided a method of forming an optical remote sensing system, the method comprising:

providing an emission channel mount having mounted thereto input ends of an array of emission fiber channels;

providing a beam steering device configured to scan a light beam from a light source across the input ends of the array of emission fiber channels mounted to the emission channel mount;

providing a plurality of sensor portions, each sensor portion configured to be exposed to a corresponding scene and having connected thereto:

an output end of a corresponding emission fiber channel of the array of emission fiber channels, the output end being configured to emit the light beam that propagated through the corresponding emission fiber channel towards the corresponding scene; and an input end of a corresponding first collection fiber channel of an array of first collection fiber channels, the input end being configured to receive a backscattered light beam with respect to the corresponding scene based on the emitted light beam from the output end of the corresponding emission fiber channel;

providing a first photodetector arranged to detect the backscattered light beams that propagated through the array of first collection fiber channels for sensing a property with respect to the corresponding scenes associated with the plurality of sensor portions; and providing a fiber channel hub configured for the array of emission fiber channels and the array of first collection fiber channels to pass through, wherein a length of the array of first collection fiber channels located between the fiber channel hub and the first photodetector is bundled to form a first collection fiber channel bundle.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 4 depicts a table summarizing a number of shortcomings associated with existing visual perception sensors;

FIG. 10 shows a table comparing various LiDAR technologies with emphasis on the limitation of the FoV;

DETAILED DESCRIPTION

As described in the background, conventional optical remote sensing systems may have limited field-of-view (FoV), thereby making them unsuitable for applications that require flexibility in FoV or that require a large FoV (e.g., an entire FoV) with respect to an observation point. In addition, conventional optical remote sensing systems may only be able to sense one property (i.e., one type of property) with respect to a scene, such as the colour information or distance information of a scene. Accordingly, various embodiments of the present invention provide an optical remote sensing system and a method of optical remote sensing that seek to overcome, or at least ameliorate, one or more deficiencies associated with conventional optical remote sensing systems and methods, such as but not limited to, enhancing FoV capability, or additionally, enabling the capture of multiple properties (i.e., multiple types of properties) of a scene, in an efficient and/or effective manner.

Figure 1A:
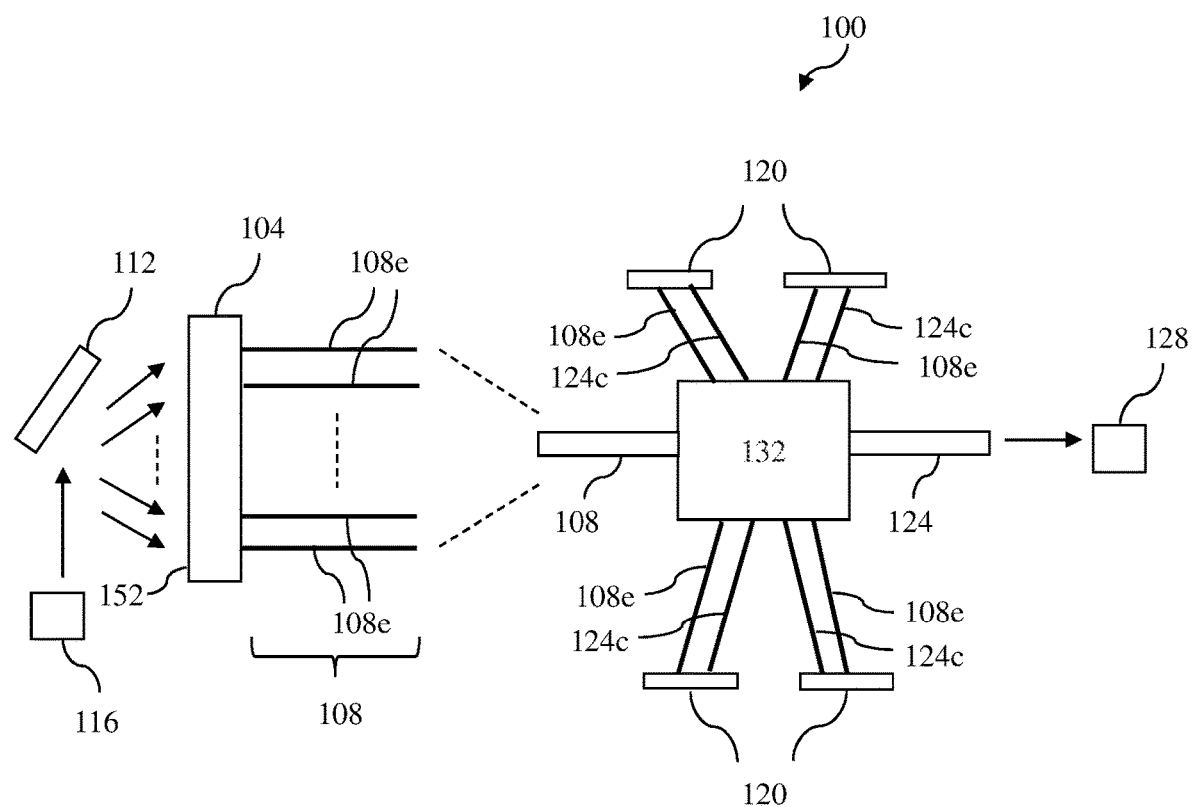
FIGS. 1A to 1C depict schematic drawings of an optical remote sensing system according to various embodiments of the present invention.

FIG. 1A depicts a schematic drawing of an optical remote sensing system 100 according to various embodiments of the present invention. The optical remote sensing system 100 comprises: an emission channel mount 104 having mounted thereto input ends of an array 108 of emission fiber channels 108e (that is, input ends of the emission fiber channels 108e, respectively, in the array 108); a beam steering device 112 configured to scan a light beam from a light source 116 across (e.g., with respect to) the input ends of the array 108 of emission fiber channels 108e mounted to the emission channel mount 104; a plurality of sensor portions 120, each sensor portion (which may also interchangeably be referred to as a sensing portion) configured to be exposed to a corresponding scene and having connected thereto: an output end of a corresponding emission fiber channel 108e of the array 108 of emission fiber channels 108e, the output end being configured to emit the light beam that propagated through the corresponding emission fiber channel 108e towards the corresponding scene (associated with the sensor portion 120); and an input end of a corresponding first collection fiber channel 124c of an array 124 of first collection fiber channels 124c, the input end being configured to receive a backscattered light beam with respect to the corresponding scene (associated with the sensor portion 120) based on the emitted light beam from the output end of the corresponding emission fiber channel 108e; a first photodetector 128 arranged to detect the backscattered light beams that propagated through the array 124 of first collection fiber channels 124c for sensing a property (e.g., which may also be referred to as an attribute or a charactertisic where appropriate) with respect to the corresponding scenes associated with the plurality of sensor portions 120 (respectively); and a fiber channel hub 132 configured for the array 108 of emission fiber channels 108e and the array 124 of first collection fiber channels 124c to pass through. Moreover, a length of the array 124 of first collection fiber channels 124c located between the fiber channel hub 132 and the first photodetector 128 is bundled to form a first collection fiber channel bundle.

The optical remote sensing system 100 advantageously has enhanced FoV capability in an efficient and/or effective manner. In particular, the plurality of sensor portions 120 are advantageously configured to be exposed to corresponding scenes, respectively, such as being distributed across a surface of an object, whereby each sensor portion 120 is oriented or configured towards a desired or predetermined direction. As a result, corresponding field-of-views (FoVs) associated with the plurality of sensor portions 120 together provide a desired FoV associated with the optical remote sensing system 100 with respect to the object, whereby the desired FoV may be a subsection of an entire FoV or the entire FoV. Accordingly, the optical remote sensing system 100 advantageously has enhanced FoV capability. Furthermore, as the optical remote sensing system 100 comprises an emission channel mount 104 having mounted thereto input ends of the array 108 of emission fiber channels 108e and a fiber channel hub 132 configured for the array 108 of emission fiber channels 108e and the array 124 of first collection fiber channels 124c to pass through, whereby a length of the array 124 of first collection fiber channels 124c located between the fiber channel hub 132 and the first photodetector 128 is bundled to form a first collection fiber channel bundle, the optical remote sensing system 100 is able to achieve the enhanced FoV capability in an efficient and/or effective manner. These advantages or technical effects will become more apparent to a person skilled in the art as the optical remote sensing system 100 is described in more detail according to various embodiments or example embodiments of the present invention.

In various embodiments, a length of the array 108 of emission fiber channels 108e located between the emission fiber channel mount 104 and the fiber channel hub 132 is bundled to form an emission fiber channel bundle.

In various embodiments, the above-mentioned length of the array 124 of first collection fiber channels 124c may be at least from the fiber channel hub 132 (e.g., a first collection fiber channel outlet thereof) to the output ends of the array 124 of first collection fiber channels 124c. In various embodiments, the above-mentioned length of the array 108 of emission fiber channels 108e may be at least from after or near the emission channel mount 104 to the fiber channel hub 132 (e.g., an emission fiber channel inlet thereof). In various embodiments, the input ends of the array 108 of emission fiber channels 108e may be mounted to the emission channel mount 104 in a spatially distributed manner (e.g., in a two-dimensional (2D) array) across a surface (a first surface or a source light beam receiving surface) of the emission channel mount 104. Therefore, it can be appreciated by a person skilled in the art that the array 108 of emission fiber channels 108e extending from the emission channel mount 104 may only be bundled starting from where the emission fiber channels 108e are able to be collected or held together (e.g., where practically possible, such as near the emission channel mount 104) and bundled to form the emission fiber channel bundle.

In various embodiments, the plurality of sensor portions 120 are distributed (e.g., spatially distributed) across a surface of an object such that corresponding FoVs associated with the plurality of sensor portions 120 together provide a desired FoV associated with the optical remote sensing system 100 with respect to the object.

In various embodiments, the desired FoV is a FoV of at least substantially an entire surrounding scene about an axis of the object, such as but not limited to, a vertical axis of a mobile platform. It will be appreciated by a person skilled in the art that the axis of the object is not limited to any particular axis of the object and may be any axis of an object as desired or as appropriate. In various embodiments, the desired FoV is a FoV of at least substantially an entire surrounding scene about multiple axes of the object, such as but not limited to a three-dimensional (3D) axes resulting in at least substantially an entire spherical surrounding scene about the object. It can be understood by a person skilled in the art that the present invention is not limited to any particular/specific or predetermined positions of the plurality of sensor portions 120 across the surface of the object, as long as the plurality of sensor portions 120 are configured or arranged across the surface of the object such that corresponding FoVs associated with the plurality of sensor portions 120 together provide a desired FoV associated with the optical remote sensing system 100 with respect to the object. For example, the ultimate positions of the plurality of sensor portions 120 may depend on the shape or configuration of the object, such that the plurality of sensor portions 120 are distributed across a surface of the object based on its shape to obtain the desired FoV.

In various embodiments, the beam steering device 112 is configured to scan the light beam from the light source across each of the input ends of the emission fiber channels 108e in succession, that is, one after another. For example, since for each emission fiber channel 108e, light beam received at the input end thereof propagates through the emission fiber channel 108e and is outputted from the output end thereof connected to the corresponding sensor portion 120 for sensing a corresponding scene (with a corresponding FoV), in each scan, the light beam may be scanned across each of the input ends of the emission fiber channels 108e in succession for sensing the corresponding scenes associated with the plurality of corresponding sensor portions 120, respectively, thereby, obtaining a desired FoV in each complete scan. In various embodiments, in each scan, the light beam may be selectively scanned across selected input ends of the emission fiber channels 108e in succession for sensing selected corresponding scenes associated with selected corresponding sensor portions 120, respectively, thereby, obtaining a desired (or selected) FoV associated with the selected corresponding sensor portions 120. For example, in various embodiments, although the optical remote sensing system 100 may be capable of providing an entire FoV with respect to the object, the optical remote sensing system 100 may be controllable to selectively provide a selected FoV, which is a subset of the entire FoV, based selectively scanning across selected input ends of the emission fiber channels 108e as described above.

In various embodiments, the optical remote sensing system 100 further comprising the light source 116, the light source 116 being configured to emit the light beam having a wavelength suitable for sensing the above-mentioned property with respect to the corresponding scenes associated with the plurality of sensor portions 120. Various wavelengths of light suitable for sensing various types of properties, respectively, are known in the art and thus need not be described herein for clarity and conciseness. Accordingly, it will be appreciated by a person skilled in the art that the optical remote sensing system 100 is not limited to any particular wavelength or multiple wavelengths.

In various embodiments, the above-mentioned property comprises distance information (e.g., a distance of an object in a scene), physical property information (e.g., a physical property (e.g., roughness) of an object in a scene) or state information (e.g., a state (e.g., vibration level) of an object in a scene). It will be appreciated by a person skilled in the art that the optical remote sensing system 100 is not limited to these types of properties, and other types of properties that can be remotely sensed, such as based on active remote sensing, are also within the scope of the present invention.

In various embodiments, the optical remote sensing system 100 further comprises the light source 116, the light source 116 being configured to emit the light beam having multiple wavelengths suitable for sensing multiple properties (i.e., multiple types of properties) with respect to the corresponding scenes associated with the plurality of sensor portions 120, each wavelength thereof being suitable for sensing a corresponding property of the above-mentioned multiple properties with respect to the corresponding scenes associated with the plurality of sensor portions 120.

In various embodiments, the above-mentioned multiple properties are selected from distance information (e.g., a distance of an object in a scene), physical property information (e.g., a physical property (e.g., roughness) of an object in a scene) and state information (e.g., a state (e.g., vibration level) of an object in a scene). As mentioned above, it will be appreciated by a person skilled in the art that the optical remote sensing system 100 is not limited to these types of properties, and other types of properties that can be remotely sensed, such as based on active remote sensing, are also within the scope of the present invention.

Figure 1B:
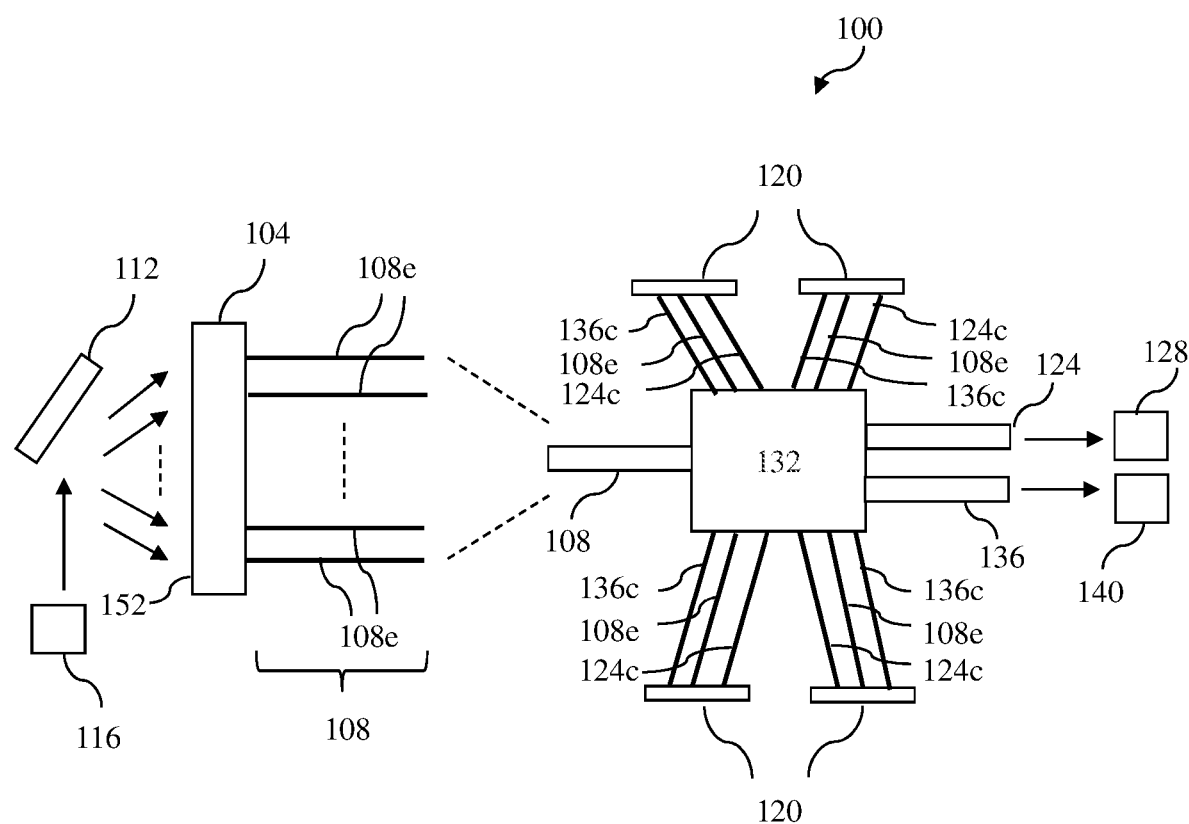

In various embodiments, in the case of the light source 116 being configured to emit the light beam having multiple wavelengths suitable for sensing multiple properties with respect to the corresponding scenes, the array 124 of first collection fiber channels 124c is configured to receive the backscattered light beams having a wavelength corresponding to one (e.g., a particular wavelength) of the multiple wavelengths of the emitted light beam. In this regard, as shown in FIG. 1B, the optical remote sensing system 100 may further comprise an array 136 of second collection fiber channels 136c for each remaining one or more of the above-mentioned multiple wavelengths of the emitted light beam (only one array 136 of second collection fiber channels 136c is shown in FIG. 1B for clarity and simplicity), each array 136 of second collection fiber channels 136c being configured to receive backscattered light beams having a wavelength corresponding to the corresponding remaining wavelength (e.g., the particular corresponding remaining wavelength) of the above-mentioned multiple wavelengths of the emitted light beam. In this regard, each of the plurality of sensor portions 120 further having connected thereto an input end of a corresponding second collection fiber channel 136c of the above-mentioned each array 136 of second collection fiber channels 136c. In other words, for each array 136 of second collection fiber channels 136c, the input end of each second collection fiber channel 136c of the array 136 is connected to the corresponding sensor portion 120.

In various embodiments, the optical remote sensing system 100 further comprises a second photodetector 140 for the above-mentioned each array 136 of second collection fiber channels 136c, each second photodetector 136 being arranged to detect the backscattered light beams that propagated through the corresponding array 136 of second collection fiber channels 136c for sensing the corresponding property of the above-mentioned multiple properties with respect to the corresponding scenes associated with the plurality of sensor portions 120. In other words, a second photodetector 140 may be provided for each array 136 of second collection fiber channels 136c (only one second photodetector 140 is shown in FIG. 1B for clarity and simplicity) for sensing the corresponding property with respect to the corresponding scenes associated with the plurality of sensor portions 120.

In various embodiments, the array 124 of first collection fiber channels 124c and each array 136 of second collection fiber channels 136c may be configured for collecting backscattered light beams for active remote sensing, e.g., backscattered light beams having different wavelengths (corresponding to the above-mentioned multiple wavelengths of the emitted light beam, respectively) for sensing different types of properties, respectively, with respect to the corresponding scenes.

In various embodiments, each array 136 of second collection fiber channels 136c is configured to pass through the fiber channel hub 132, and for the above-mentioned each array 136 of second collection fiber channels 136c, a length of the array 136 of second collection fiber channels 136c located between the fiber channel hub 132 and the corresponding second photodetector 140 is bundled to form a second collection fiber channel bundle. In various embodiments, the above-mentioned length may be at least from the fiber channel hub 132 (e.g., from a corresponding second collection fiber channel outlet thereof) to the output ends of the array 136 of second collection fiber channels 136c, in the same or similar manner as the array 124 of first collection fiber channels 124c as described herein.

Figure 1C:
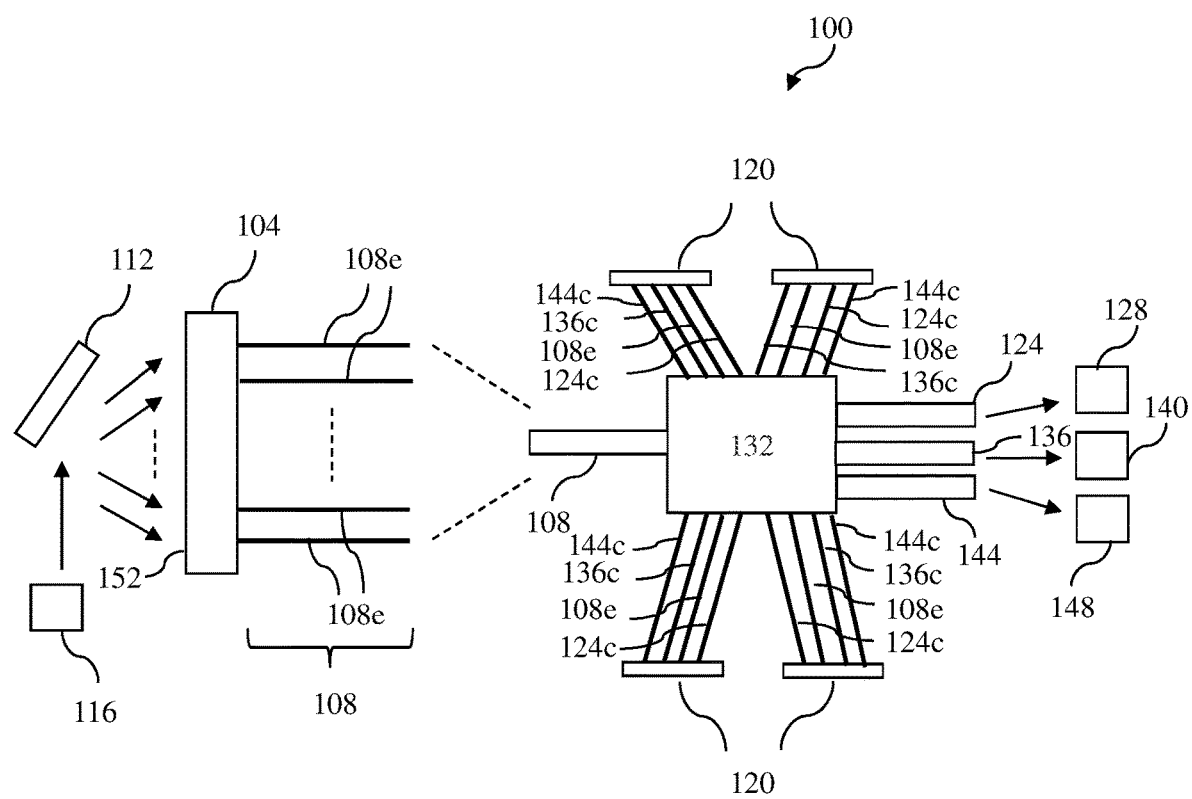

In various embodiments, as shown in FIG. 1C, the optical remote sensing system 100 may further comprise one or more arrays 144 of third collection fiber channels 144c (only one array 144 of third collection fiber channels 144c is shown in FIG. 1C for clarity and simplicity), each array 144 of third collection fiber channels 144c being configured to receive reflected or radiated light beams for sensing a corresponding additional property with respect to the corresponding scenes associated with the plurality of sensor portions 120. In this regard, each of the plurality of sensor portions 120 further having connected thereto an input end of a corresponding third collection fiber channel 144c of the above-mentioned each array 144 of third collection fiber channels 144c. In other words, an array 144 of third collection fiber channels 144c may be provided for sensing each particular corresponding additional property with respect to the corresponding scenes associated with the plurality of sensor portions 120. Furthermore, for each array 144 of third collection fiber channels 144c, the input end of each third collection fiber channel 144c of the array 144 is connected to the corresponding sensor portion 120.

In various embodiments, the above-mentioned additional property comprises colour information (e.g., colour(s) of an object in a scene, sensed based on a reflected light beam from the object) or temperature information (e.g., a temperature of a medium or an object in a scene, sensed based on a radiated light beam from the object). It will be appreciated by a person skilled in the art that the optical remote sensing system 100 is not limited to these types of properties, and other types of properties that can be remotely sensed, such as based on passive remote sensing, are also within the scope of the present invention.

In various embodiments, the optical remote sensing system 100 further comprises a third photodetector 148 for the above-mentioned each array 144 of third collection fiber channels 144c, each third photodetector being arranged to detect the reflected or radiated light beams that propagated through the corresponding array 144 of third collection fiber channels 144c for sensing the corresponding additional property with respect to the corresponding scenes associated with the plurality of sensor portions 120. In other words, a third photodetector 148 may be provided for each array 144 of third collection fiber channels 144c (only one third photodetector 148 is shown in FIG. 1C for clarity and simplicity) for sensing the corresponding property with respect to the corresponding scenes associated with the plurality of sensor portions 120.

In various embodiments, each array 144 of third collection fiber channels 144c may be configured for collecting reflected or radiated light beams for passive remote sensing, e.g., different reflected or radiated light beams for sensing different types of properties, respectively, with respect to the corresponding scenes, such as a reflected light beam from an object to sense colour(s) of the object or a radiated light beam from an object to sense a temperature of the object.

In various embodiments, each array 144 of third collection fiber channels 144c is configured to pass through the fiber channel hub 132, and for the above-mentioned each array 144 of third collection fiber channels 144c, a length of the array 144 of third collection fiber channels 144c located between the fiber channel hub 132 and the third photodetector 148 is bundled to form a third collection fiber channel bundle. In various embodiments, the above-mentioned length may be at least from the fiber channel hub 132 (e.g., from a corresponding third collection fiber channel outlet thereof) to the output ends of the array 144 of third collection fiber channels 144c, in the same or similar manner as the array 124 of first collection fiber channels 124c as described herein.

In various embodiments, the fiber channel hub 132 comprises an emission fiber channel inlet configured to receive the emission fiber channel bundle 108, and a first collection fiber channel outlet configured to output the first collection fiber channel bundle 124. In this regard, after being received by the emission fiber channel inlet, the array 108 of emission fiber channels 108e are unbundled and emission fiber channels 108e thereof are correspondingly distributed to the plurality of sensor portions 120 for connection thereto. Similarly, before being output from the first collection fiber channel outlet, the array 124 of first collection fiber channels 124c are unbundled and first collection fiber channels 124c thereof are correspondingly distributed to the plurality of sensor portions 120 for connection thereto. The fiber channel hub 132 may further comprise a second collection fiber channel outlet for each array 136 of second collection fiber channels 136c, and/or a third collection fiber channel outlet for each array 144 of third collection fiber channels 144c. Similar to or the same as the array 124 of first collection fiber channels 124c, for each array 136 of second collection fiber channels 136c, before being output from the second collection fiber channel outlet, the array 136 of second collection fiber channels 136c are unbundled and second collection fiber channels 136c thereof are correspondingly distributed to the plurality of sensor portions 120 for connection thereto. Similar to or the same as the array 124 of first collection fiber channels 124c, for each array 144 of third collection fiber channels 144c, before being output from the third collection fiber channel outlet, the array 144 of third collection fiber channels 144c are unbundled and third collection fiber channels 144c thereof are correspondingly distributed to the plurality of sensor portions 120 for connection thereto.

In various embodiments, the emission channel mount 104 comprises an enclosure having at least a partial (or partially) spherical shape (e.g., a partial enclosure), and the input ends of the array 108 of emission fiber channels 108e are mounted through the enclosure so as to be exposed from an inner side 152 of the enclosure. As described hereinbefore, the input ends of the array 108 of emission fiber channels 108e may be mounted to the emission channel mount 104 in a spatially distributed manner (e.g., in a two-dimensional (2D) array) across a surface (a first surface or a source light beam receiving surface, that is, corresponding to the above-mentioned inner side 152) of the emission channel mount 104. In this regard, it will be appreciated by a person skilled in the art that the input ends of the array 108 of emission fiber channels 108e may be spatially distributed in any manner as desired or as appropriate, such as based on or in cooperation with the beam steering device such that the beam steering device 112 may scan the light beam from the light source 116 across the input ends of the array 108 of emission fiber channels 108e in a manner as desired or as appropriate.

In various embodiments, each emission fiber channel 108e of the array 108 of emission fiber channels 108e comprises a fiber optic line (e.g., one or more fiber optic lines), and each first collection fiber channel 124c of the array 124 of first collection fiber channels 124c comprises a fiber optic line (e.g., one or more fiber optic lines). Similarly, in various embodiments, each second collection fiber channel 136c of the array 136 of second collection fiber channels 136c comprises a fiber optic line (e.g., one or more fiber optic lines), and/or each third collection fiber channel 144c of the array 144 of third collection fiber channels 124c comprises a fiber optic line (e.g., one or more fiber optic lines).

In various embodiments, the light beam from the light source 116 is a laser light beam.

In various embodiments, the beam steering device 104 is a motor-less beam steering device.

In various embodiments, the above-mentioned property comprises the distance information, and the optical remote sensing system 100 further comprises a sensed information processing module configured to generate a point cloud data based on the distance information detected by the first photodetector 128 with respect to the corresponding scenes associated with the plurality of sensor portions 120.

In various embodiments, for example in the case of multiple properties (i.e., multiple types of properties) being sensed with respect to the corresponding scenes associated with the plurality of sensor portions 120, the above-mentioned property comprises the distance information, and the optical remote sensing system 100 further comprises a sensed information processing module configured to generate a point cloud data based on the distance information detected by the first photodetector 128 with respect to the corresponding scenes associated with the plurality of sensor portions 120, and associate each data point in the point cloud data with the corresponding additional property corresponding to the data point detected by the third photodetector 148 for the above-mentioned each array 144 of third collection fiber channels 144c with respect to the corresponding scenes associated with the plurality of sensor portions 120. By way of example only and without limitation, in the case of multiple properties comprises distance information, colour information and temperature information, a point cloud data may be generated based on the distance information detected by the first photodetector 128 with respect to the corresponding scenes associated with the plurality of sensor portions 120, and furthermore, for each data point in the point cloud data, the data point is associated with the corresponding colour information and the corresponding temperature information detected by the third photodetector 148 for the above-mentioned each array 144 of third collection fiber channels 144c with respect to the corresponding scenes associated with the plurality of sensor portions 120. Accordingly, a point cloud data with additional property or properties with respect to the corresponding scenes associated with the plurality of sensor portions 120 may advantageously be obtained according to various embodiments of the present invention, and such a point cloud data with additional property or properties may be referred to herein as a multi-dimensional point cloud data.

It will be appreciated by a person skilled in the art that various techniques for generating a point cloud data based on distance information (e.g., based on LiDAR) are known in the art and thus need to be described in detail herein for conciseness and clarity.

It will be appreciated by a person skilled in the art that the at least one processor may be configured to perform the required functions or operations through set(s) of instructions (e.g., software modules) executable by the at least one processor to perform the required functions or operations. Accordingly, for example, the sensed information processing module (or a sensed information processing circuit) may be configured to generate the above-mentioned point cloud data based on the distance information. As another example, a beam steering controller module (or a beam steering controller circuit) may be provided and configured to control the beam steering device 112 to scan the light beam from the light source across (or with respect to) the input ends of the emission fiber channels 108e in a particular or desired manner, such as described hereinbefore according to various embodiments of the present invention. For example, the sensed information processing module and the beam steering controller module may each be implemented as an executable software program, which for example may be stored in the memory and executable by the at least one processor to perform the functions/operations as described herein according to various embodiments.

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

It will be appreciated by a person skilled in the art that various modules described herein (e.g., the sensed information processing module and/or the beam steering controller module) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

In various embodiments, there is provided a computer program product, embodied in one or more computer-readable storage mediums (non-transitory computer-readable storage medium), comprising instructions (e.g., the sensed information processing module or the beam steering controller module) executable by one or more computer processors to generate the above-mentioned point cloud data based on distance information according to various embodiments.

Figure 2A:
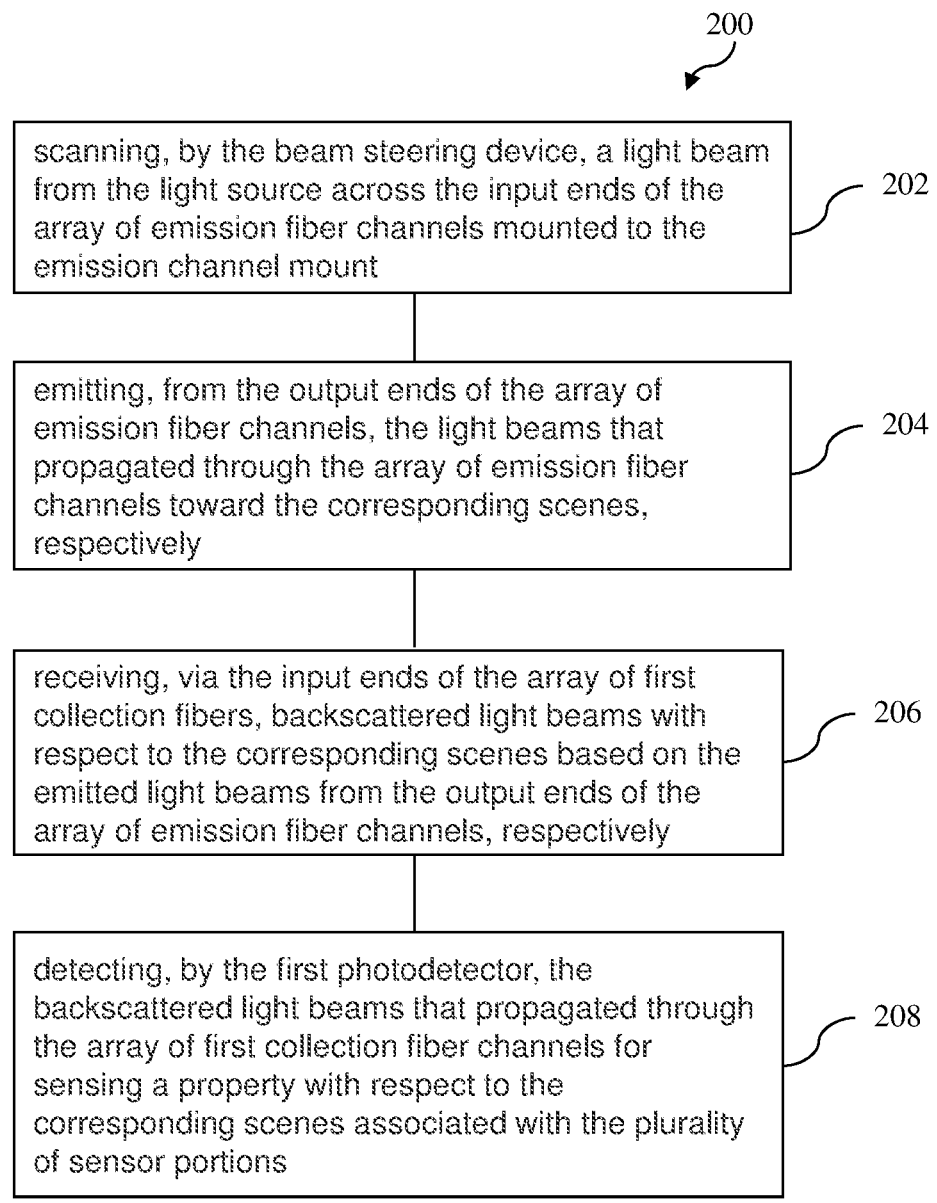
FIGS. 2A and 2B depict schematic flow diagrams illustrating methods of optical remote sensing according to various embodiments of the present invention.

FIG. 2A depicts a schematic flow diagram illustrating a method 200 of optical remote sensing according to various embodiments, using the optical remote sensing system 100 as described hereinbefore according to various embodiments (e.g., as described hereinbefore with reference to any one of FIG. 1A, FIG. 1B and FIG. 1C). The method 200 comprises: scanning (at 202), by the beam steering device 112, a light beam from the light source 116 across (e.g, with respect to) the input ends of the array 108 of emission fiber channels 108e mounted to the emission channel mount 104; emitting (at 204), from the output ends of the array 108 of emission fiber channels 108e, the light beams that propagated through the array 108 of emission fiber channels 108e toward the corresponding scenes, respectively; receiving (at 206), via the input ends of the array 124 of first collection fibers 124c, backscattered light beams with respect to the corresponding scenes based on the emitted light beams from the output ends of the array 108 of emission fiber channels 108e, respectively; and detecting (at 208), by the first photodetector 128, the backscattered light beams that propagated through the array 124 of first collection fiber channels 124c for sensing a property (e.g., which may also be referred to as an attribute or a charactertistic where appropriate) with respect to the corresponding scenes associated with the plurality of sensor portions 120 (respectively).

In various embodiments, the method 200 of optical remote sensing corresponds to the optical remote sensing system 100 as described hereinbefore according to various embodiments (e.g., with reference to FIG. 1A), therefore, various steps or operations of the method 200 may correspond to various functions or operations in which various components (or elements) of the optical remote sensing system 100 are configured to perform, as described hereinbefore according to various embodiments, and thus need not be repeated with respect to the method 200 for clarity and conciseness. In other words, various embodiments described herein in context of the optical remote sensing system 100 (e.g., with reference to FIG. 1A) are analogously valid for the method 200 of optical remote sensing, and vice versa.

In various embodiments, the above-mentioned scanning (at 202) the light beam comprises scanning the light beam from the light source 116 across each of the input ends of the array 108 of emission fiber channels 108e in succession (i.e., one after another).

In various embodiments, the light beam emitted from the light source 116 has a wavelength suitable for sensing the above-mentioned property with respect to the corresponding scenes. In various embodiments, the above-mentioned property comprises distance information (e.g., a distance of an object in a scene), physical property information (e.g., a physical property (e.g., roughness) of an object in a scene) or state information (e.g., a state (e.g., vibration level) of an object in a scene). It will be appreciated by a person skilled in the art that the method 200 of optical remote sensing is not limited to these types of properties, and other types of properties that can be remotely sensed, such as based on active remote sensing, are also within the scope of the present invention.

In various embodiments, the above-mentioned property comprises the distance information, and the method 200 further comprises generating a point cloud data based on the distance information detected by the first photodetector 128 with respect to the corresponding scenes associated with the plurality of sensor portions 120.

Figure 2B:
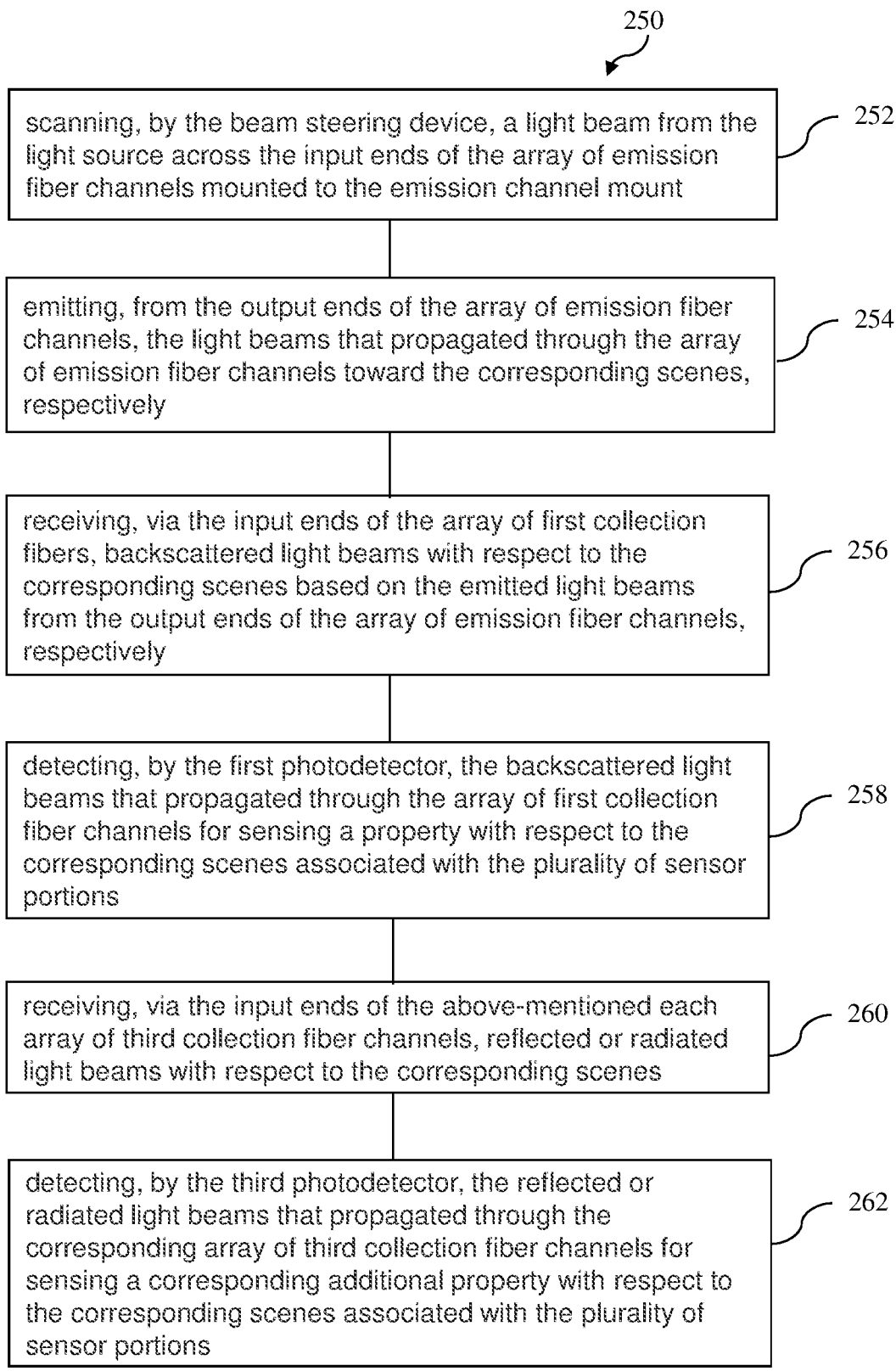

FIG. 2B depicts a schematic flow diagram illustrating a method 250 of optical remote sensing according to various embodiments, using the optical remote sensing system 100 as described hereinbefore according to various embodiments (e.g., as described hereinbefore with reference to FIG. 1C). The method 250 comprises: scanning (at 252), by the beam steering device 112, a light beam from the light source 116 across (e.g, with respect to) the input ends of the array 108 of emission fiber channels 108e mounted to the emission channel mount 104; emitting (at 254), from the output ends of the array 108 of emission fiber channels 108e, the light beams that propagated through the array 108 of emission fiber channels 108e toward the corresponding scenes, respectively; receiving (at 256), via the input ends of the array 124 of first collection fiber channels 124c, backscattered light beams with respect to the corresponding scenes based on the emitted light beams from the output ends of the array 108 of emission fiber channels 108e, respectively; detecting (at 258), by the first photodetector 128, the backscattered light beams that propagated through the array 124 of first collection fiber channels 124c for sensing a property with respect to the corresponding scenes associated with the plurality of sensor portions 120; receiving (at 260), via the input ends of the above-mentioned each array of third collection fiber channels, reflected or radiated light beams with respect to the corresponding scenes; and detecting (at 262), by the third photodetector 148, the reflected or radiated light beams that propagated through the corresponding array 144 of third collection fiber channels 144c for sensing a corresponding additional property with respect to the corresponding scenes associated with the plurality of sensor portions 120.

In various embodiments, the method 250 of optical remote sensing corresponds to the optical remote sensing system 100 as described hereinbefore according to various embodiments (e.g., with reference to FIG. 1C), therefore, various steps or operations of the method 250 may correspond to various functions or operations in which various components (or elements) of the optical remote sensing system 100 are configured to perform, as described hereinbefore according to various embodiments, and thus need not be repeated with respect to the method 250 for clarity and conciseness. In other words, various embodiments described herein in context of the optical remote sensing system 100 (e.g., with reference to FIG. 1C) are analogously valid for the method 250 of optical remote sensing, and vice versa.

In various embodiments, the above-mentioned scanning (at 252) the light beam comprises scanning the light beam from the light source across each of the input ends of the array 108 of emission fiber channels 108e in succession (i.e., one after another).

In various embodiments, the light beam emitted from the light source 116 has a wavelength suitable for sensing the above-mentioned property with respect to the corresponding scenes. In various embodiments, the above-mentioned property comprises distance information (e.g., a distance of an object in a scene), physical property information (e.g., a physical property (e.g., roughness) of an object in a scene) or state information (e.g., a state (e.g., vibration level) of an object in a scene). In various embodiments, the above-mentioned additional property comprises colour information (e.g., colour(s) of an object in a scene, sensed based on a reflected light beam from the object) or temperature information (e.g., a temperature of a medium or an object in a scene, sensed based on a radiated light beam from the object). It will be appreciated by a person skilled in the art that the method 250 of optical remote sensing is not limited to these types of properties, and other types of properties that can be remotely sensed, such as based on active and/or passive remote sensing, are also within the scope of the present invention.

In various embodiments, the above-mentioned property comprises the distance information, and the method 250 further comprises generating a point cloud data based on said distance information detected by the first photodetector 128 with respect to the corresponding scenes associated with the plurality of sensor portions 120, and associate each data point in the point cloud data with the corresponding additional property corresponding to the data point detected by the third photodetector 148 for the above-mentioned each array 144 of third collection fiber channels 144c with respect to the corresponding scenes associated with the plurality of sensor portions 120.

Figure 3:
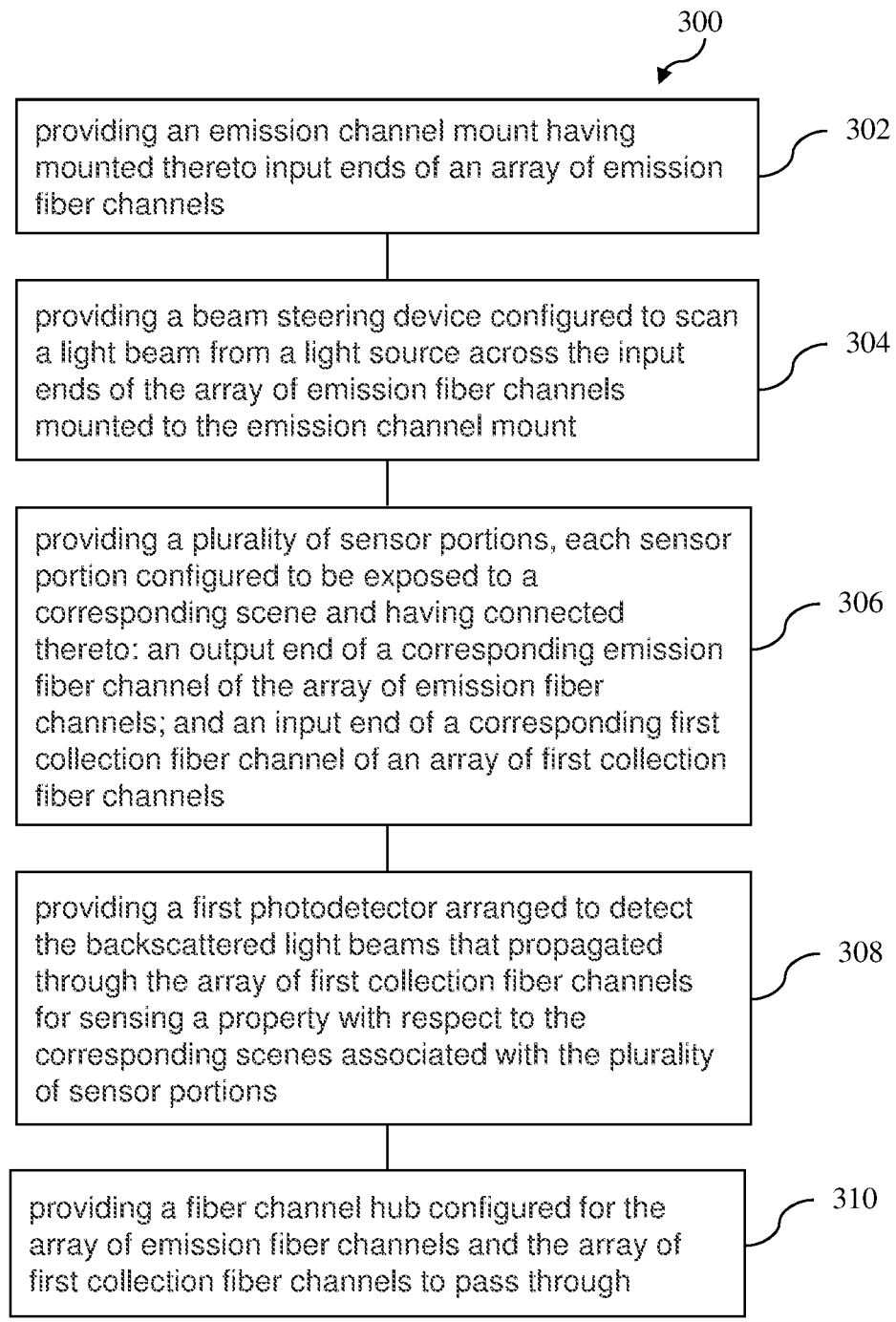
FIG. 3 depicts a schematic flow diagram illustrating a method of forming an optical remote sensing system according to various embodiments of the present invention.

FIG. 3 depicts a schematic flow diagram illustrating a method 300 of forming an optical remote sensing system according to various embodiments of the present invention, such as the optical remote sensing system 100 as described hereinbefore with reference to any one of FIG. 1A, FIG. 1B and FIG. 1C. The method 300 comprising: providing (at 302) an emission channel mount 104 having mounted thereto input ends of an array 108 of emission fiber channels 108e; providing (at 304) a beam steering device 112 configured to scan a light beam from a light source across (with respect to) the input ends of the array 108 of emission fiber channels 108e mounted to the emission channel mount 104; providing (306) a plurality of sensor portions 120, each sensor portion 120 configured to be exposed to a corresponding scene and having connected thereto: an output end of a corresponding emission fiber channel 108e of the array 108 of emission fiber channels 108e, the output end being configured to emit the light beam that propagated through the corresponding emission fiber channel 108e towards the corresponding scene; and an input end of a corresponding first collection fiber channel 124c of an array 124 of first collection fiber channels 124c, the input end being configured to receive a backscattered light beam with respect to the corresponding scene based on the emitted light beam from the output end of the corresponding emission fiber channel 108e; providing (at 308) a first photodetector 128 arranged to detect the backscattered light beams that propagated through the array 124 of first collection fiber channels 124c for sensing a property with respect to the corresponding scenes associated with the plurality of sensor portions (respectively); and providing (310) a fiber channel hub 132 configured for the array 108 of emission fiber channels 108e and the array 124 of first collection fiber channels 124c to pass through. Moreover, a length of the array 124 of first collection fiber channels 124c located between the fiber channel hub 132 and the first photodetector 128 is bundled to form a first collection fiber channel bundle.

In various embodiments, the method 300 is for forming the optical remote sensing system 100 as described hereinbefore with reference to any one of FIG. 1A, FIG. 1B and FIG. 1C, therefore, various steps or operations of the method 300 may correspond to forming, providing or configuring various components or elements of the optical remote sensing system 100 as described hereinbefore according to various embodiments, and thus such corresponding steps or operations need not be repeated with respect to the method 300 for clarity and conciseness. In other words, various embodiments described herein in context of the optical remote sensing system 100 are analogously valid for the method 300 (e.g., for forming the optical remote sensing system 100 having various components and configurations as described hereinbefore according to various embodiments), and vice versa.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present inventions will be described hereinafter by way of examples only and not limitations. It will be appreciated by a person skilled in the art that the present invention may, however, be embodied in various different forms and should not be construed as limited to the example embodiments set forth hereinafter. Rather, these example embodiments are provided so that this disclosure will be thorough and complete, and will fully convey the scope of the present invention to those skilled in the art.

Sensing multiple optical/visual properties (i.e., multiple types of properties) of a scene may be required in various applications. It will be appreciated by a person skilled in the art that there are a variety of different types of properties of a scene that may be sensed by an optical remote sensing system. According to various example embodiments, preferred types of properties of a scene that are sensed may include colour, depth (or distance) and/or temperature, and they will be described further hereinafter by way of examples only. It will be appreciated by a person skilled in the art that the present invention is not limited these specific types of properties of a scene, and other types of properties of a scene may be sensed (in addition to or instead of one or more of the above-mentioned specific types of properties) based on the optical remote sensing system 100 as desired or as appropriate, without going beyond the scope of the present invention, such as but not limited to, roughness, smoothness, transparency, vibration, and so on.

Colour camera is a well-known sensor for the perception of visual information. This is mainly because it may be the most basic, accessible and inexpensive commercial cameras that can produce understandable pictures for human eye. Basic RGB cameras produce two-dimensional (2D) images. If the camera is equipped with a lens, the output picture is distorted according to the properties of the lens. Basic cameras have a number of limitations, including:

limited FoV (e.g., due to the natural limitation of the existing photosensor arrays);
    distortion (lens effect);
    lack of depth information (except for very short ranges and limited to a certain depth of field);
    sensitivity to lighting conditions; and
    limited depth of field (due to the lens, only objects at a certain range or depth may be in focus, and the rest of the image may be blurred).

In relation to the limitation of FoV, multiple remedies have been previously disclosed, including:

incorporation of panoramic view lenses (to cover the entire FoV across azimuth angle);
    incorporation of parabolic and hyperbolic mirror (to extend the FoV in azimuth and altitude directions); and
    calibration of multiple cameras, oriented toward different directions.

In relation to distortion, software techniques may be applied to compensate for distortion. For example, if the camera is equipped with a microprocessor, the lens effect may be compensated. This issue may be addressed at a higher level programming as well, provided that the lens properties are known to the software developer.

In relation to the lack of depth information, stereo vision may be applied, which is a technique for the estimation of depth information from two cameras that are properly calibrated. For example, such an estimation may be accurate within a limited range (typically 2 to 10 meters). There are also other techniques for depth measurement, which are based on complementary active sensors.

In relation to sensitivity to lighting conditions, cameras are generally sensitive to the lighting condition. For example, a picture captured by a camera under direct sunlight is very different from a picture captured in a dark environment. Partial compensation may be achieved through automatic sensing of the ambient light intensity and applying an external flash light. However, when a flashing visible light is not desired (e.g. military applications), or when the desired object is partly under direct sun and partly in shade, compensation without applying active measurement techniques becomes very challenging.

In relation to the limited depth of field, the natural shortcoming of the incorporation of a lens is the limited depth of field. In this regard, only objects within a limited depth are in focus and the rest of the image may be blurred. For example, by adding a microlens array to the camera, it is possible to capture the entire depth of field and refocus on any part of the image, after the scene is captured, or reconstruct an image which is focused in all pixels. However, the attempt to extend the FoV and depth of field at the same time necessitates the incorporation and processing of the images coming from, for example, tens of cameras at the same time. Therefore, the resulting capturing device becomes bulky, and the measurable range yet remains within a few meters.

LiDAR is a sensor that estimates the distance from a surface by measuring the time-of-flight (ToF) of a light beam, which is scattered after hitting the surface. LiDAR can measure short distances (e.g., sub-centimeters) and long distances (e.g., several kilometers), and the measurement precision can reach the micrometer (μm) range. Although the emitting light beam can be selected from a large range of the light spectrum, it may be common to use a wavelength of 905 nm or 1550 nm for this purpose.

There also exist planar LiDARs or 2D LiDARs. While one single LiDAR module can be used to measure the distance from a single spot of an object, it is possible to mount the module on a rotary stage and scan a segment of a plane by properly registering sensor readings at different angles (e.g., different steps of rotation of a motor). However, the incorporation of a motor introduces undesirable consequences, such as:

undesirable vibration of the sensor;
lifetime (durability) concerns when the sensor is mounted on a shaky/highly dynamic platform;
excessive weight;
excessive dimension; and
scan rate limitations.

In multi-plane LiDARs, the array of LiDAR modules in linear or radial arrangement can be rotated on a rotational stage to scan a segment of a cylinder or a sphere.

In three-dimensional (3D) LiDARs, similar to the concept of planar scanning, it is possible to orientate LiDAR modules toward different spatial directions to scan a 3D scene. However, the motorized designs are either too slow or bulky, or the scan output of such designs is sparse and non-uniform. On the other hand, conventional designs based on MEMS (micro-electro-mechanical systems) or phased-array beam steering techniques may be limited in FoV. A recent methodology for 3D scanning is based on the incorporation of a diffuser lens and the generation of image over a photodiode array. Although this technique may extend the FoV, for example, it cannot be extended to the sides and back of the sensor.

There has been disclosed an active RGB camera, which may also be referred to as a colored LiDAR. Although a colour camera is generally known as a passive sensor, active measurement techniques have been incorporated in a colour camera to collect color and depth information through a single instrument based on an alternative principle. In an approach, a red laser source, a green laser source, and a blue laser source are used for three LiDAR modules. This way, any of the three LiDAR modules may measure the time-of-flight (ToF). Moreover, the amount of red, green, and blue color reflected from the object may also be sensed through the same photosensor, and the color of the object can thus be known too. However, shining a visible light at an object may not be desirable in many applications.

There have also been disclosed different types of cameras and LiDARs to capture RGB-D and temperature information. The main problem with these designs is the calibration of a camera with a LiDAR, which is only valid within a limited depth of field of the sensor. Besides, such a sensing device is a bulky and expensive combination.

Accordingly, as discussed above, existing visual perception sensors (or visual remote sensing techniques) suffer from one or multiple shortcomings and a number of shortcomings are summarized in the table shown in FIG. 4. Therefore, for various applications such as smart mobility, which is absolutely dependent on visual perception sensors, there does not appear to be a complete and reliable solution available at reasonable prices. Accordingly, various example embodiments provide an optical remote sensing system and a corresponding optical remote sensing method, that seeks to overcome, or at least ameliorate, as much of the above-mentioned shortcomings as possible, such as all of them, while being affordable at the same time.

The optical remote sensing system according to various example embodiments of the present invention is based on LiDAR. Components of LiDAR sensor are known to a person skilled in the art and thus need not be repeated herein for conciseness. For example, a single beam time-of-flight LiDAR sensor approximates the distance from the sensor to an object through measurement of the time-of-flight of the light beam from the light beam being emitted to the backscattered light beam being received. For example, the main components of such a sensor comprise: a light source; collimation optics; time-of-flight measurement electronics; collection optics; and a photosensor. In relation to the light source, a common source of light for LiDAR application may include a light source of (a light beam having) 905 nm or 1550 nm wavelength. In relation to collimation optics, a lens or a combination of lenses may be utilized to collimate the emitted light. For example, the output of the collimation optics may be a collimated light beam within the eye-safe power level for civil applications. In relation to time-of-flight measurement electronics, time-of-flight measurement electronics known in the art may be used to measure the time of travel of the light beam, and thus need to be described in detail herein. In relation to collection optics, the light emitted to the object gets scattered and a portion of the light may return towards the sensor. The collection optics (e.g., a lens) may collect as much as possible of the backscattered light and directs the collected backscattered light towards the photosensor, which may be placed at a focal point of the lens. In relation to the photosensor, the collected backscattered light from the object may be sensed by the photosensor. Various photosensors, which may also be referred to as photodetectors, suitable for detecting light, such as reflected light or backscattered light, for various purposes are known in the art and thus need not be described in detail here.

Figure 5:
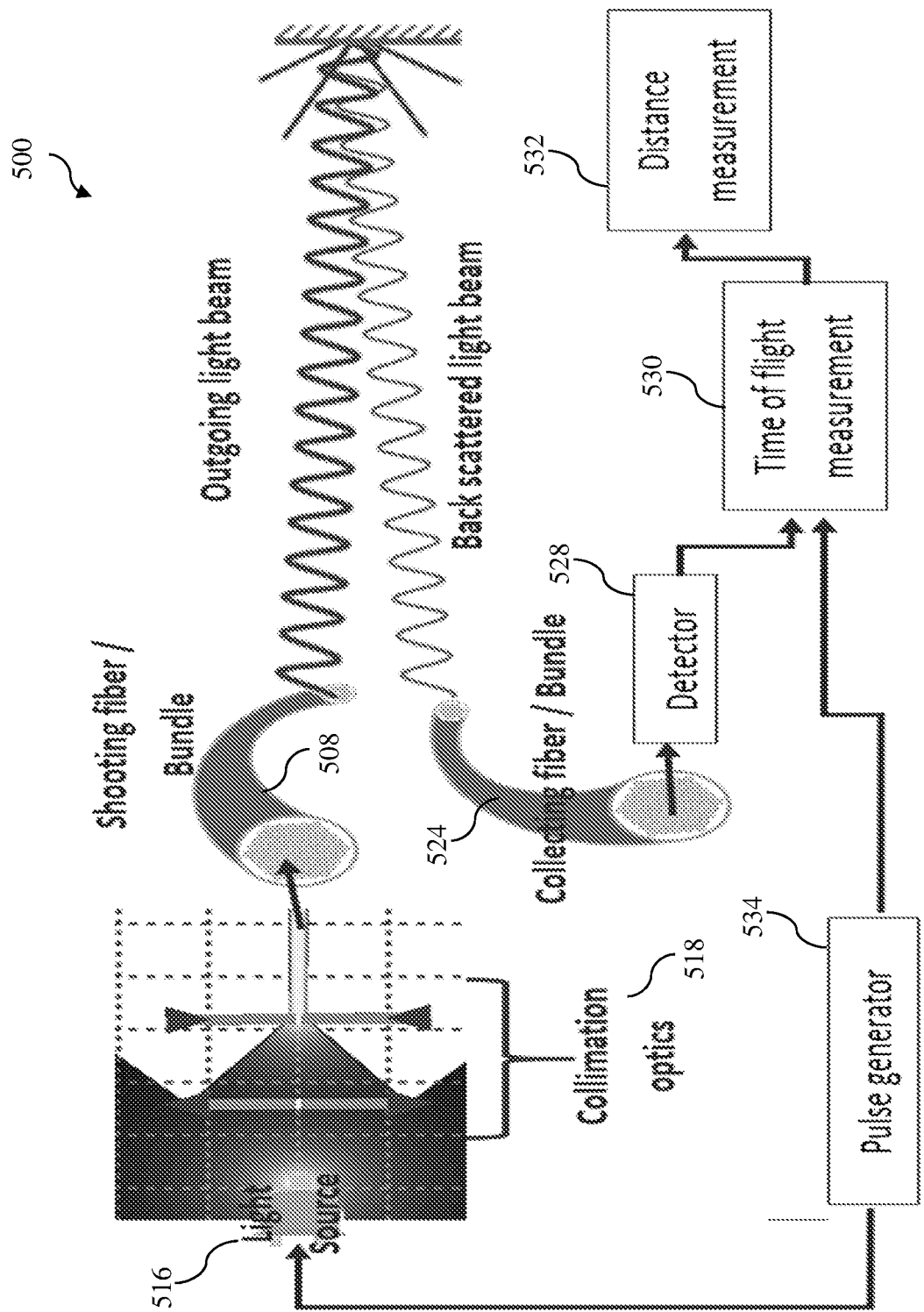
FIG. 5 depicts a schematic drawing of an optical remote sensing system, based on a single beam probe, according to various example embodiments of the present invention.

FIG. 5 depicts a schematic drawing of an optical remote sensing system 500, based on a single beam probe, according to various example embodiments of the present invention. In particular, FIG. 5 illustrates an optical remote sensing system 500 based on a LiDAR with a single beam fiber probe. The optical remote sensing system 500 comprises a light source 516, collimation optics 518; an emission fiber or fiber bundle (which may also be referred to as a shooting fiber or fiber bundle) 508, a collection fiber or fiber bundle (which may also be referred to as a collecting fiber or fiber bundle) 524, a photodetector (or photosensor) 528, a time-of-flight measurement module 530, a distance measurement module 532 (e.g., corresponding to the sensed information processing module described hereinbefore according to various embodiments) and a pulse generator 534.

In various example embodiments, the light generated by the light source 516 is collimated and directed to a single strand or a bundle of optical fiber strands 508 (shooting fiber or fiber bundle). The optical fiber 508 is flexible and may be directed to any desired orientation. The backscattered light may be collected by a single strand or a bundle of optical fiber strands 524 (collecting fiber or fiber bundle) adjacent to the shooting fiber bundle 508. The collected backscattered light beam may then be directed to the photodetector 528 without requiring a collection lens. In various example embodiments, the collecting fiber bundle 524 may be attached to the photodetector 528 such that there is no need for collection optics in front of the photodetector 528. Furthermore, as the shooting fiber bundle 508 and the collecting fiber bundle 524 are flexible, they may be oriented towards any desired directions.

Figure 6:
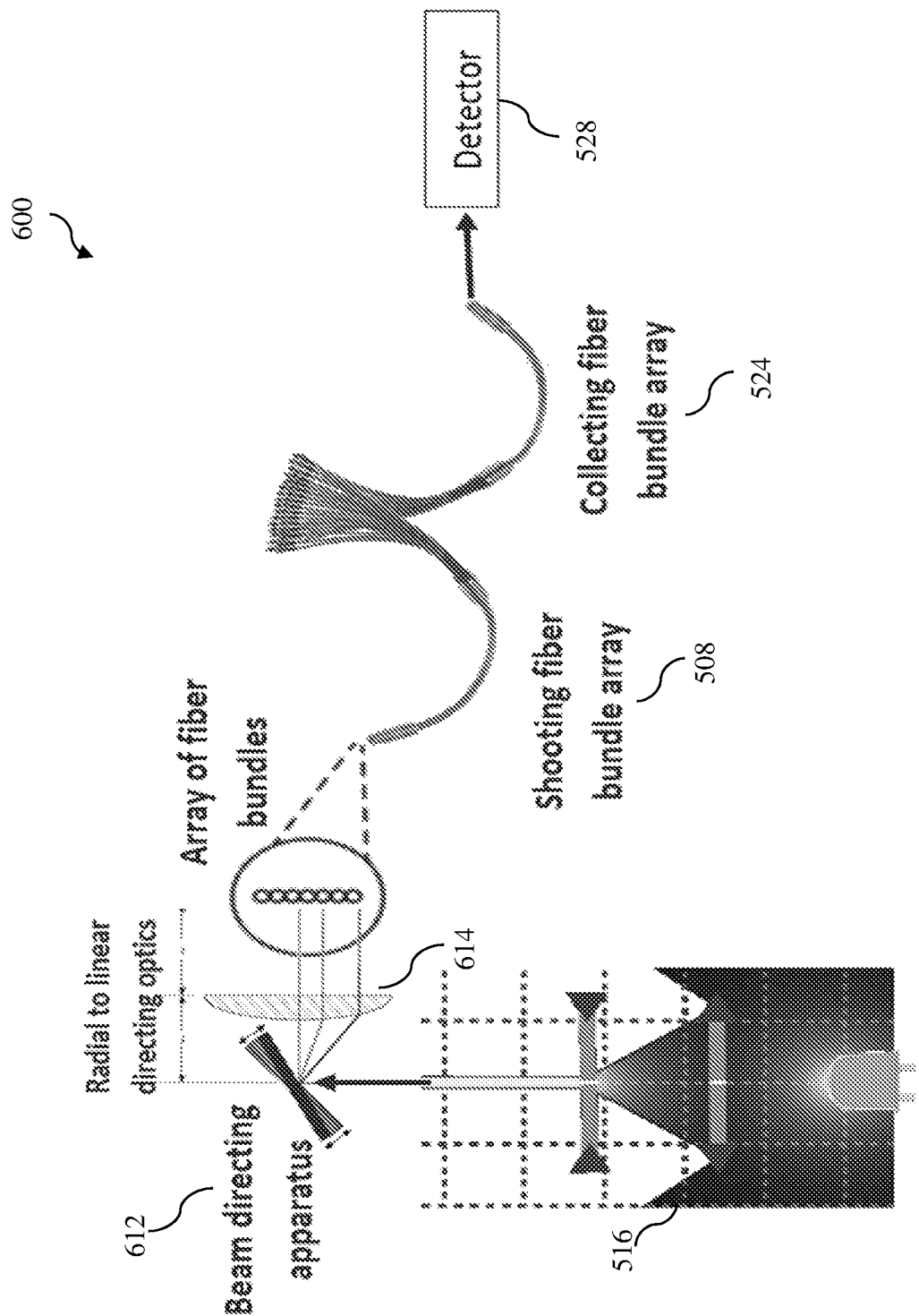
FIG. 6 depicts a schematic drawing of an optical remote sensing system, based on a multi-beam fiber probe, according to various example embodiments of the present invention.

FIG. 6 depicts a schematic drawing of an optical remote sensing system 600 (such as corresponding to the optical remote sensing system 100 as described hereinbefore according to various embodiments (e.g., FIG. 1A)), based on a multi-beam fiber probe, according to various example embodiments of the present invention. In particular, FIG. 6 illustrates an optical remote sensing system 600 based on a LiDAR with a multi-beam fiber probe. The optical remote sensing system 600 may be similar or the same as the optical remote sensing system 500 shown in FIG. 5, except that the optical remote sensing system 600 further includes a beam steering device 612 (which may also be referred to as a beam directing device or apparatus), which may be added as a middle stage to the optical remote sensing system 600. As the optical remote sensing system 600 is based on a multi-beam fiber probe, the emission (or shooting) fibers 508 may be in the form of an array of emission (or shooting) fibers and the collection (or collecting) fibers 524 may be in the form of an array of collection (or collecting) fibers. As shown in FIG. 6, a length of the array of emission fibers 508 may be bundled and a length of the array of collection fibers 524 may also be bundled. In the optical remote sensing system 600 shown in FIG. 6, it will be appreciated that various modules shown in FIG. 5, such as the time-of-flight measurement module 530, the distance measurement module 532 and/or the pulse generator 534, may be included in the optical remote sensing system 600 but are not shown in FIG. 6 for simplicity and clarity.

In various example embodiments, the beam directing apparatus 612 may be based on a MEMS mirror or a phased-array beam steering setup. In various example embodiments, the beam directing apparatus 612 may be combined with an optics 614 that converts radial-directing to linear-directing, which may be in the form of a single lens or a micro lens array. For example, this may be applicable in the case of input ends of the array of emission fibers 508 being arranged or configured in a 2D array having a planar form (e.g., the input ends mounted to an emission channel mount to form such a 2D array), such that optics 614 may be required to convert radial-directing to linear-directing, such as illustrated in FIG. 6. In various example embodiments, the above-mentioned optics 614 may be excluded in the case of input ends of the array of emission fibers 508 being arranged or configured in a 2D array having a curved form (e.g., the input ends mounted to an emission channel mount to form such a 2D array), such as a partially spherical form, such that the input ends are radially pointed towards the desired point of the beam directing apparatus 612, such as a center thereof. As a result, the reflected light beam from the MEMS mirror may be directed directly (radially) towards the input ends of the array of emission fibers 508, without requiring any optics to convert radial-directing to linear-directing. Similarly, as the array of emission fibers 508 and the array of collection fibers 524 are flexible, they may be oriented, including their end points, toward any desired directions.

Figure 7:
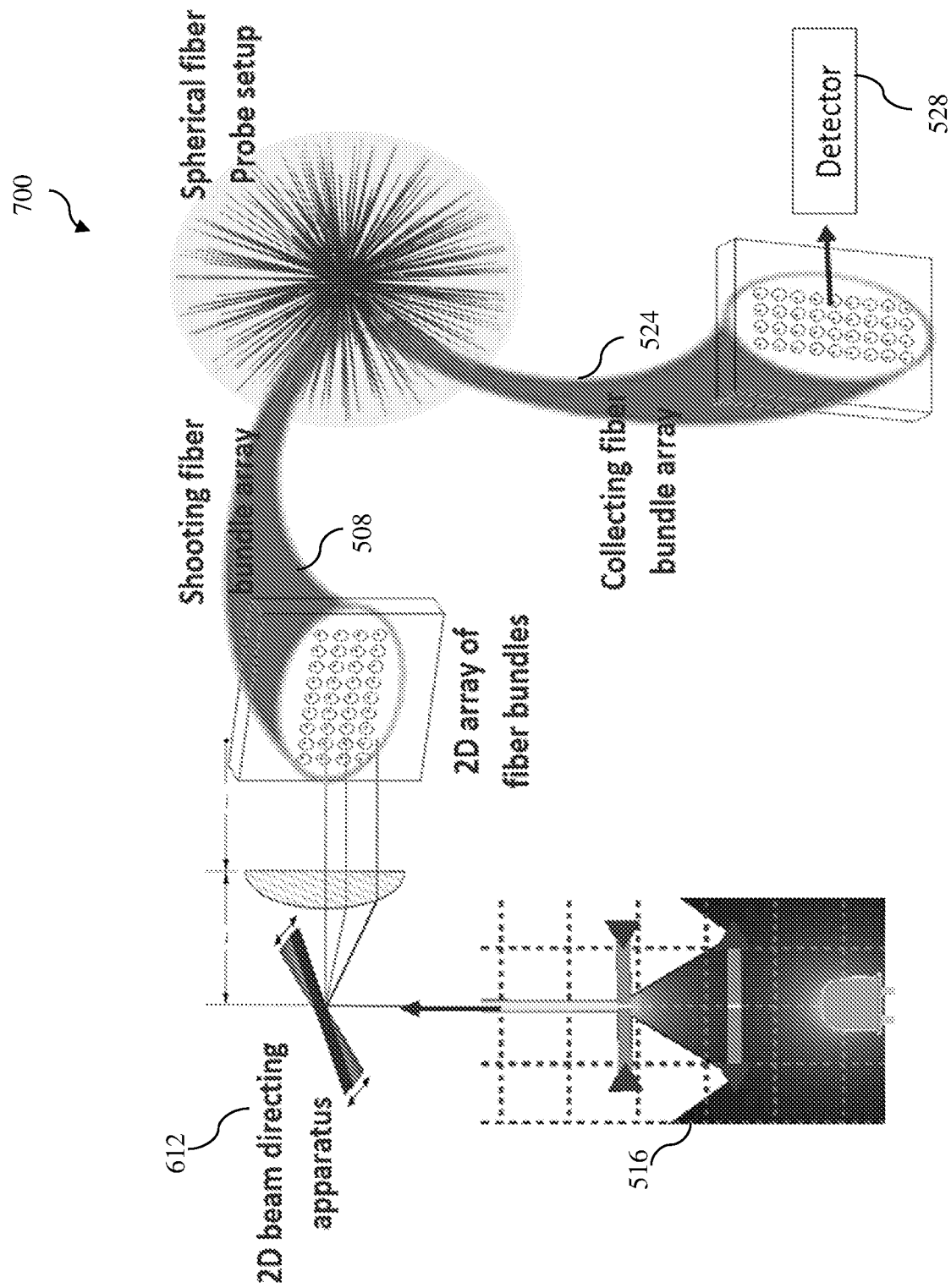
FIG. 7 depicts a schematic drawing of another optical remote sensing system, based on a multi-beam fiber probe, according to various example embodiments of the present invention.

FIG. 7 depicts a schematic drawing of an optical remote sensing system 700 (such as corresponding to the optical remote sensing system 100 as described hereinbefore according to various embodiments (e.g., FIG. 1A)), based on a multi-beam fiber probe, according to various example embodiments of the present invention. The optical remote sensing system 700 may be similar or the same as the optical remote sensing system 600 shown in FIG. 6, which is configured to capture an entire FoV (or at least substantially an entire FoV) of an entire surrounding scene (or at least substantially an entire surrounding scene) about an observation point or an object, about one or more axes of the observation point or object, including an entire spherical surrounding scene. Similar to FIG. 6, in the optical remote sensing system 700 shown in FIG. 7, it will be appreciated that various modules shown in FIG. 5, such as the time-of-flight measurement module 530, the distance measurement module 532 and/or the pulse generator 534, may be included in the optical remote sensing system 700 but are not shown in FIG. 7 for simplicity and clarity.

In various example embodiments, the array of emission fibers 508 may have input ends configured in a t2D array, such as in a planar form or a curved form as described hereinbefore. In various example embodiments, the input ends of the array of emission fibers 508 may be mounted to an emission channel mount, for example, having a planar form or a curved form. In various example embodiments, the array of collection fibers 524 may have output ends configured in a 2D array for outputting backscattered light collected to the photodetector 528.

In various example embodiments, the beam directing apparatus 612 may be configured to scan a light beam from the light source 516 across (e.g., with respect to) the input ends of the array of emission fibers 508, such as across each of the input ends in succession, and such as described hereinbefore according to various embodiments.

In various example embodiments, to obtain the desired FoV (e.g., an entire FoV), a plurality of sensor portions (e.g, corresponding to the plurality of sensor portions 120 as described hereinbefore) may be distributed across a surface of an object, each sensor portion configured to be exposed to a corresponding scene and having connected thereto: an output end of a corresponding emission fiber of the array of emission fibers 508 (the output end being configured to emit the light beam that propagated through the corresponding emission fiber channel towards the corresponding scene); and an input end of a corresponding collection fiber of an array of collection fibers 524 (the input end being configured to receive a backscattered light beam with respect to the corresponding scene based on the emitted light beam from the output end of the corresponding emission fiber). In various example embodiments, the plurality of sensor portions may be distributed across the surface of the object such that corresponding FoVs associated with the plurality of sensor portions together provide the desired FoV (e.g., an entire FoV) associated with the optical remote sensing system with respect to the object. By way of an example only and without limitation, if the object is spherical, the plurality of sensor portions (having output ends (e.g., LiDAR probe endpoints) of the array of emission fibers 508 connected thereto correspondingly) may be uniformly distributed across the surface of the spherical object to obtain an entire spherical FoV (or at least substantially entire spherical FoV since certain very small angles may be omitted) as schematically illustrated in FIG. 7. This may be referred to as a spherical shaped fiber probe assembly or setup for capturing an entire FoV.

For example, as the beam directing apparatus 612 may be configured to scan the light beam from the light source 516 across each of the input ends of the array of emission fibers 508 in succession, the light beam may then be emitted at corresponding output ends of the array of emission fibers 508 in succession, and since the plurality of sensor portions may be distributed across a surface of an object such that they together provide a desired FoV, a surrounding scene with the desired FoV may thus be sensed by the optical remote sensing system 700 according to various example embodiments.

In various example embodiments, the optical remote sensing system 700 may further comprise a fiber channel hub (not shown in FIG. 7) within the object and configured for the array of emission fiber 508 and the array of collection fibers 524 to pass through. In various example embodiments, prior to entering the fiber channel hub, a length of the array of emission fiber 508 may be bundled to form an emission fiber bundle, and after entering the fiber channel hub, the array of emission fiber 508 may be unbundled and emission fibers thereof may be correspondingly distributed to the plurality of sensor portions for connection thereto. Similarly, prior to leaving the fiber channel hub, the array of collection fibers 524 may be unbundled and collection fibers thereof may be correspondingly distributed to the plurality of sensor portions for connection thereto. After leaving the fiber channel hub, a length of the array of collection fibers 524 may be bundled and an output end of the array of collection fibers 524 may be directed or orientated towards the photodetector 528.

It will be appreciated by a person skilled in the art that any desired sub-section of a sphere may be selected as the desired FoV, and that the sphere is only an example of a complex geometry. In various example embodiments, the plurality of sensor portions (e.g., including fiber end-points) may be embedded (or integrated) in or attached (or affixed) to any surface of any object having any shape (e.g., any level of shape complexity), such as but not limited to, a vehicle or one or more components thereof (e.g., a car bumper thereof), a flying robot or one or more components thereof (e.g., a propeller protector thereof). It will be appreciated by a person skilled in the art that the present invention is not limited to being applied to any particular type of object, and may be applied to any object from which a surrounding scene is desired to be sensed.

Figure 8:
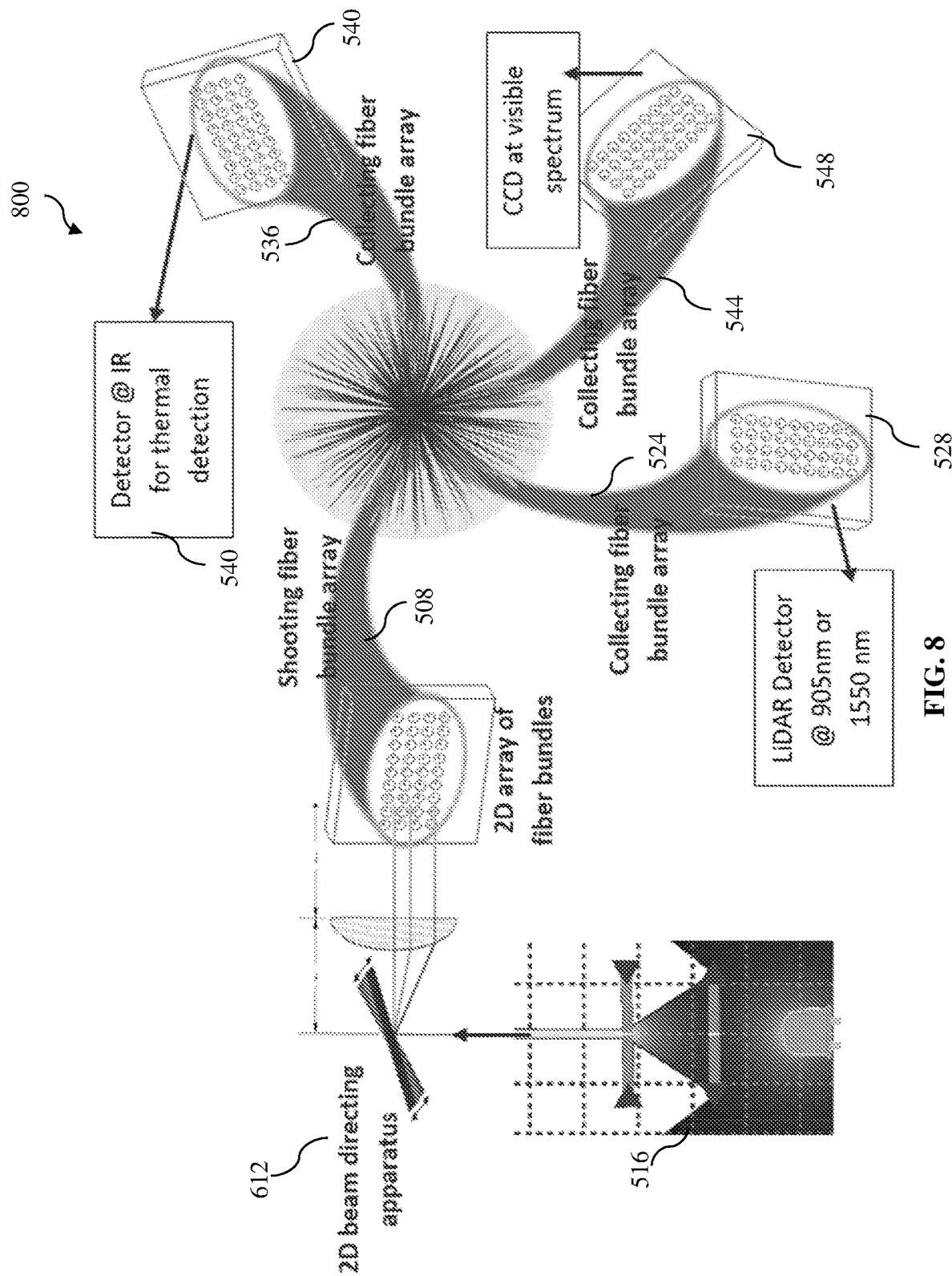
FIG. 8 depicts a schematic drawing of yet another optical remote sensing system, based on a multi-beam fiber probe, according to various example embodiments of the present invention.

FIG. 8 depicts a schematic drawing of an optical remote sensing system 800 (such as corresponding to the optical remote sensing system 100 as described hereinbefore according to various embodiments (e.g., FIG. 1B or FIG. 1C)), based on a multi-beam fiber probe, according to various example embodiments of the present invention. The optical remote sensing system 800 may be similar or the same as the optical remote sensing system 700 shown in FIG. 7, except that it is further configured to capture multiple types of properties of a surrounding scene, including based on active sensing and passive sensing. Accordingly, the optical remote sensing system 800 may be considered as having a mixed active-passive probe assembly or setup capable of capturing an entire FoV. Similar to FIG. 7, in the optical remote sensing system 800 shown in FIG. 8, it will be appreciated that various modules shown in FIG. 5, such as the time-of-flight measurement module 530, the distance measurement module 532 and/or the pulse generator 534, may be included in the optical remote sensing system 800 but are not shown in FIG. 7 for simplicity and clarity.

In various example embodiments, the multiple types of properties of the surrounding scene may include three types of properties as shown in FIG. 8, namely, distance information (e.g., a distance of an object in a scene, such as based on an active measurement at a wavelength of 905 nm or 1550 nm), colour information (e.g., colour(s) of an object in a scene, such as passive sensing in the visible spectrum) and temperature information (e.g., a temperature of an object or a medium in a scene, such as passive sensing of infrared light radiated or emitted by the object). It will be appreciated by a person skilled in the art that the present invention is not limited to these number and/or types of properties and other number and/or types of properties (in addition to or instead of) may be sensed based on the optical remote sensing system 800 as desired or as appropriate.

In various example embodiments, an array of collection fibers, and a corresponding photodetector, may be provided for each type of property to be detected, such as illustrated in FIG. 8. For example, the above-mentioned array of collection fibers 524 may be an array of first collection fibers configured to collect backscattered light from a surrounding scene for detecting distance information, an array of second collection fibers 536 may be configured to collect radiated light (infrared light) from a surrounding scene for detecting temperature information, and an array of third collection fibers 544 may be configured to collect reflected light from a surrounding scene for detecting colour information. In various example embodiments, the array of first collection fibers 524, the array of second collection fibers 536 and the array of third collection fibers 544 may each be arranged in the same or similar manner in the optical remote sensing system 800. For example, the array of first collection fibers 524 may have input ends (of first collection fibers 524 thereof) connected to the plurality of sensor portions, respectively, as described hereinbefore with respect to FIG. 7. Similarly, the array of second collection fibers 536 may have input ends (of second collection fibers 536 thereof) connected to the plurality of sensor portions, respectively, and the array of third collection fibers 544 may have input ends (of third collection fibers 544 thereof) connected to the plurality of sensor portions, respectively, in the same or similar manner. Accordingly, each sensor portion may have connected thereto the input end of a corresponding first collection fiber 524, the input end of a corresponding second collection fiber 536 and the input end of a corresponding third collection fiber 544. Furthermore, a first photodetector 528 configured for detecting backscattered light beams for sensing distance information (e.g., a LiDAR detector) may be arranged (e.g., coupled thereto) to detect the backscattered light beams collected from the array of first collection fibers 524, a second photodetector 540 configured for detecting reflected infrared light for sensing temperature information (e.g., an infrared photodetector) may be arranged (e.g., coupled thereto) to detect the radiated light (infrared light) collected from the array of second collection fibers 536 and a third photodetector 548 configured for detecting reflected light for sensing colour information (e.g., a colour photodetector) may be arranged (e.g., coupled thereto) to detect the reflected light collected from the array of third collection fibers 544.

Accordingly, the optical remote sensing system 800 having the above-described configuration according to various example embodiments are able to capture multiple wavelengths (i.e., multiple types of wavelengths), and more particularly, different types of properties (e.g., distance information, temperature information, and colour information) at the same time via different photodetectors (e.g., 528, 540, 548).

In various example embodiments, a single array of collection fibers may be provided for collecting the above-mentioned multiple wavelengths, that is, the backscattered light beams for sensing distance information, the radiated light for sensing temperature information and the reflected light for sensing colour information, and such different types of collected lights may then be split, e.g., using a dichroic beam splitter, into different light paths towards the corresponding photodetectors. In various example embodiments, if active sensing of multiple properties is desired, multiple wavelengths may be combined in the light source. In various example embodiments, the returned light may then be split and filtered for corresponding different photodetectors.

It will be appreciated by a person skilled in the art that additional wavelengths (and thus additional types of properties of a scene) may be detected in the same or similar manner, based on active and/or passive remote sensing techniques, based on the optical remote sensing system 800.

Figure 9:
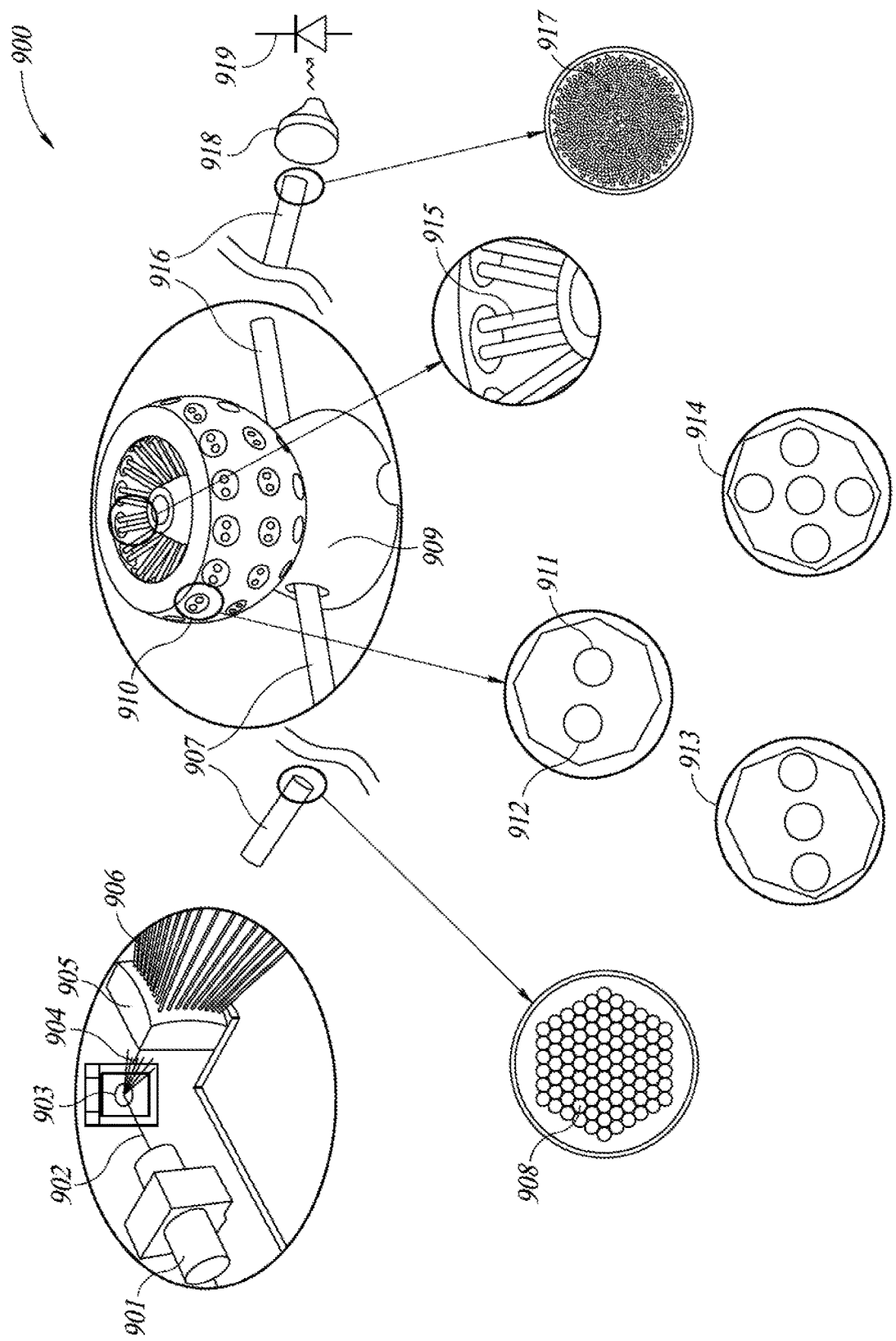
FIG. 9 depicts a schematic drawing of still another optical remote sensing system, according to various example embodiments of the present invention.

FIG. 9 depicts a schematic drawing of an optical remote sensing system 900 (such as corresponding to the optical remote sensing system 100 as described hereinbefore according to various embodiments (e.g., any one of FIG. 1A, FIG. 1B and FIG. 1C) according to various example embodiments of the present invention. The optical remote sensing system 900 may be similar or the same as the optical remote sensing system 700, 800 shown in FIG. 7 and FIG. 8 but having an example configuration for illustration purpose only and without limitation. Similar to FIG. 7, in the optical remote sensing system 900 shown in FIG. 9, it will be appreciated that various modules shown in FIG. 5, such as the time-of-flight measurement module 530, the distance measurement module 532 and/or the pulse generator 534, may also be included in the optical remote sensing system 900 but are not shown in FIG. 9 for simplicity and clarity.

The optical remote sensing system 900 comprises one or more light sources (or emitters) 901. The light source 901 may be configured to produce a light beam 902 (e.g., a laser light beam) having one or multiple desired wavelengths. For example, the number of wavelengths may be determined based on the number of types of properties desired to be measured based on active sensing, and the wavelengths utilized may be selected based on the types of properties desired to be measured based on active sensing (e.g., wavelengths of 905 or 1550 nm for active sensing distance information). The light beam 902 may include light pulses with different wavelengths (e.g., with respect to the different types of measured properties) and different pulse widths. The optical remote sensing system 900 may further comprise a beam steering apparatus 903 configured to direct the emitted light beam 902 to different emission fiber channels 906. By way of examples only and without limitation, the beam steering apparatus 904 may be a one-dimensional (1D) or a two-dimensional (2D) MEMS mirror. However, it will be appreciated by a person skilled in the art that the present invention is not limited to MEMS mirror for beam steering and other types of beam steering apparatus (preferably motor-less beam steering apparatus) known in the art may be utilized instead without going beyond the scope of the present invention. The directed light beam 904 has the same content as the light beam 902, but has been directed by the beam steering apparatus 904 towards the desired emission fiber channel 906. The optical remote sensing system 900 may further comprise an emission channel mount 905 that is used as a mount for the emission fiber channels 906. In particular, the emission channel mount 905 has mounted thereto input ends of the emission fiber channels (array of emission fiber channels) 906. Accordingly, the emission channel mount 905 may comprise a plurality of holes or inlets for receiving the input ends of the emission fiber channels 906, respectively. Furthermore, the plurality of holes may each be oriented such that a central axis of the hole points towards a desired point (e.g., a central point) of the beam steering apparatus 903. As described hereinbefore, the emission channel mount 903 may have a planar form or configuration or a curved form or configuration. By way of an example only, in FIG. 9, the emission channel mount 903 has a curved form, such as a cut-out section of a thick sphere.

The emission fiber channels (array of emission fiber channels) 906 may each comprise one or more fiber optic lines, each fiber optic line comprising one or more fiber optic strands. The light beam received in the emission fiber channel 906 may propagate therein and may be directed to a corresponding sensor portion (which may also be referred to as a mounting set) 910. In various example embodiments, the emission fiber channels 906 are selected or configured to have a smaller Numerical Aperture (NA). In this regard, the exact number for the NA may depend on the closest readable distance and the furthest readable distance the LiDAR is designed for. By way of an example only and without limitation, the NA of the emission fiber channel may be 0.22 and less.

In various example embodiments, a length of the array of emission fiber channels 906 may be bundled to form an emission fiber channel bundle 907. A cross-sectional view of the emission fiber channel bundle 907 is shown at 908. In various example embodiments, fiber strands of different emission fiber channels in the emission fiber channel bundle 907 are not mixed, that is, fiber strands belonging to an emission fiber channel are held together within the emission fiber channel, and are not mixed with fiber strands belonging to other emission fiber channel(s). For example, by not mixing the fiber strands, this helps to ensure that the light coming from the source is eventually emitted from one emission fiber channel at each time, and this facilitates the scanning of the emission fiber channels one by one (and not multiple channels at the same time). For example, since each emission fiber channel may be dedicated to sensing the distance towards one specific direction in the space, scanning the emission fiber channels one by one, enables the direction being scanned at each time to be determined, and at the same time, eliminates or at least mitigates possible interferences that may be caused by reading multiple channels simultaneously.

The emission fiber channel bundle 907 may extend to a fiber channel hub 909. In various example embodiments, the fiber channel hub 909 may be within or a part of a sensor probe head or an object of which a surrounding scene is desired to be sensed, such a sensor probe head or such an object having distributed on its surface the above-mentioned sensor portions (or mounting sets) 910. By way of an example only and without limitation, FIG. 9 illustrates a sensor probe head of which a surrounding scene is desired to be sensed, having distributed on its surface the above-mentioned sensor portions (or mounting sets) 910. For example and without limitation, the sensor probe head may have a spherical configuration. It will be appreciated by a person skilled in the art that the object of which a surrounding scene is desired to be sensed may have any shape and/or configuration, depending on the type of the object, such as a simple shape (e.g., a disk shape) or a complex shape (e.g., a car bumper or an entire flying robot chassis). As shown in FIG. 9, after being received by an inlet of the fiber channel hub 909, the emission fiber channels coming out of the emission fiber channel bundle 907 may then be distributed or directed to corresponding sensor portions 910 for connection thereto. The fiber channel hub 909 may have any shape or configuration as appropriate for enabling fiber channels to pass through and distributing fiber channels to the sensor portions 910, such as but not limited to, a conical shape as shown in FIG. 9.

Each sensor portion 910 may be configured to be exposed to a corresponding scene (e.g., arranged at a particular location on a surface of an object and directed or oriented towards a desired direction) and having connected thereto the input end 911 (e.g., an emission channel tip) of a corresponding emission fiber channel 906 and an output end 912 (e.g., a collection channel tip) of a corresponding collection fiber channel 915. At each sensor portion 910, the emission channel tip 911 may usually be the center channel that shines the light beam 904. In various example embodiments, one emission fiber channel 906 per sensor portion 910 is sufficient to bring multiple wavelengths. In various example embodiments, there may be multiple emission fiber channels per sensor portion 910 to bring multiple wavelengths, respectively. Each sensor portion 910 may also have connected thereto one or more collection channel tips 912 of one or more arrays of collection fiber channels, respectively. By way of examples only and without limitation, three example configurations of a sensor portion 910 is shown in FIG. 9, namely, a sensor portion having one emission channel tip and one collection channel tip connected thereto, a sensor portion having one emission channel tip and two collection channel tips connected thereto, and a sensor portion having one emission channel tip and four collection channel tips connected thereto. It will be appreciated by a person skilled in the art that the present invention is not limited to the example configurations shown in FIG. 9, and other configurations may also be implemented as desired or as appropriate, such as depending on the number of emission and collection channels, which can vary with respect to the application.

The emission channel tip 911 may be the tip of the emission fiber channel 906 that eventually shines the light beam towards a corresponding scene (e.g., at the target object). In various example embodiments, the emission channel tip 911 may be tip-shaped or tip-lensed for light-collimation purpose.

The collection channel tip 912 may be the tip of the collection fiber channel 915 that captures the backscattered light or the light reflected or radiated from a corresponding scene (e.g., from a target object). In various example embodiments, the collection channel tip 912 may be tip-shaped or tip-lensed to capture wider FoV (e.g., for the purpose of capturing the backscattered light from the target object), or to capture narrower FoV (e.g., to capture visible light for determination of the color of a desired spot on the target object).

In various example embodiments, the sensor portion 910 may be a multi-collector sensor portion such as illustrated at 913 and 914. Multiple arrays of collection fiber channels may be provided according to various example embodiments of the present invention. According to various example embodiments, multiple arrays of collection fiber channels may be provided to capture more backscattered light or reflected or radiated light. According to various example embodiments, multiple arrays of collection fiber channels may be provided to maintain symmetry in sensor readings. According to various example embodiments, multiple arrays of collection fiber channels may be provided to deliver different types of collected light to different photosensors, respectively, where each photosensor is configured or dedicated to sense a certain wavelength or a certain range of wavelengths, such as the backscattered light and reflected or radiated light to two separate photosensors, respectively. For example, this helps to eliminate the usage of expensive optics to deliver or direct light to different photosensors. In various example embodiments, each collection fiber channel may be tip-shaped differently from other collection fiber channel(s) in the same sensor portion. For example, one collection fiber channel may be tip-shaped for wider FoV and another collection fiber channel may be tip-shaped to capture a narrower FoV. In various example embodiments, different collection fiber channels in the same sensor portion may be configured or optimized to accept or receive a particular wavelength or a particular range of wavelengths. For example, this eliminates the need to use a dedicated filter for each photosensor. If different collection fiber channels (of different or multiple arrays of collection fiber channels) are used to collect different wavelengths, the collection fiber channels belonging to the same group (i.e., of the same array), coming from different sensor portions, may be bundled together (e.g., before being output from an outlet of the fiber channel hub 909) to form a respective collection fiber channel bundle 916.

In various example embodiments, the collection fiber channels 916 may each comprise one or more fiber optic lines, each fiber optic line comprising one or more fiber optic strands. Each collection fiber channel 916 may collect the backscattered, reflected or radiated light from a corresponding scene (e.g., a target object therein) and direct the backscattered, reflected or radiated light to a photodetector 919. In various example embodiments, each collection fiber channel bundle 916 (including an array of collection fiber channels) may include all collection fiber channels 915 belonging to the same group (i.e., of the same array) from all sensor portions 910. In various example embodiments, in each collection fiber channel bundle 916, the fiber strands of the collection fiber channels may come together (may be collected or held together) with no specific ordering, and make one bundle of unordered collection fiber channels (or fiber strands). In other words, in each collection fiber channel bundle 916, the fiber strands of the collection fiber channels may be mixed, that is, fiber strands belonging to a collection fiber channel may not be held together within the collection fiber channel (not grouped separately), and may thus be mixed with fiber strands belonging to other collection fiber channel(s). In various example embodiments, such fiber strands in the collection fiber channel bundle 916 may be mixed with no specific ordering, that is, unordered.

In various example embodiments, the output ends of collection fiber channels in the collection fiber channel bundle 916 may be collectively be referred to as an output end or a collection bundle tip 917 of the collection fiber channel bundle 916. In other words, the collection bundle tip 917 is formed by the output ends of the collection fiber channels that belong to the same group (i.e., of the same array). Furthermore, as described above, in various example embodiments, the fiber strands in the collection fiber channel bundle 916 may be mixed at the output end (collection bundle tip) 917 thereof, such as shown in FIG. 9. Although a random ordering, or a uniform ordering of fiber strands, or some other specific ordering patterns might enhance the readings, in various example embodiments, it is not necessary for the fiber strands in the collection fiber channel bundle 916 to follow any specific ordering, pattern or configuration at the collection bundle tip 917.

In various example embodiments, if the dimension of the collection bundle tip 917 is larger than the surface of the photosensor 919, a fiber taper 918 may be used to address or correct the size mismatch.

In various example embodiments, in relation to the photosensor 919, a single cell of a photosensor may be used to sense the collected light that comes from the collection bundle tip 917, directly or indirectly such as from the fiber taper 918 in case such an element is used to correct the size mismatch as explained above. In various example embodiments, the photosensor 917 may be configured or dedicated to sensing at a specific wavelength or a specific range of wavelengths. According to various example embodiments, although it is possible to use an array (1D or 2D) of sensor cells, a single cell may be used for better results and lower cost. As described hereinbefore, according to various example embodiments, multiple photosensors for different wavelengths, respectively, may be used when multiple properties are configured or desired to be sensed.

It will be understood by a person skilled in the art that after light beams (e.g., backscattered light beams, reflected light beams and/or radiated light beams) are collected and detected as described hereinbefore according to various embodiments or example embodiments of the present invention, various techniques for processing one or more of the collected and detected light beams for determining one or more corresponding properties with respect to the corresponding scenes associated with the sensor portions are known in the art and thus need not be described herein for clarity and conciseness.

In various example embodiments, there is provided a light detection and ranging system (or an optical remote sensing system) comprising: a light directing apparatus configured to receive light from a light source; a shooting fiber bundle comprising an array of transmission optical fibers with each transmission optical fiber having a proximal end to receive light from the light directing apparatus and a distal end (which may be lensed tip) to emit light to an object; and a collecting fiber bundle comprising an array of receiving optical fibers with each receiving optical fiber having a proximal end that receives the backscattered light from the object and a distal end configured to couple the scattered light to a photodetector.

In various example embodiments, there is provided a method of light detection and ranging (e.g., corresponding to a method of opertical remote sensing) comprising: directing light from a light source to a light directing apparatus; controlling the light directing apparatus to direct the light to an array of transmission optical fibers of the shooting fiber bundle wherein the light is directed to one fiber channel within the shooting fiber at each time; emitting the light towards an object through a shooting fiber probe tip; receiving the backscattered light from the object using a collecting fiber probe tip; the collecting fiber tip at the distal end merges with the other collecting fibers in an unordered bundle; and coupling the backscattered light from the collecting fiber bundle to a detector (an adapter fiber optic taper may be used to adjust the dimension mismatch).

In various example embodiments, the shooting and the collecting fiber probe tips are configured to emit and collect light from any desired segments within an entire FoV.

In various example embodiments, the shooting and the collecting fiber probe tips to achieve the entire FoV can be distributed across the surface of an object, such as the body of a moving platform.

In various example embodiments, the light source comprises a laser light source.

In various example embodiments, the light directing apparatus comprises a motor-less beam steering device, such as a microelectromechanical system (MEMS) mirror.

In various example embodiments, a fiber optic taper adapter may be used for coupling between the collecting fiber bundle and the corresponding detector to adjust dimension mismatch.

In various example embodiments, there is provided a light detection and ranging system (e.g., corresponding to an optical remote sensing system) corresponding to the above-mentioned method of light detection and ranging.

In various example embodiments, the light detection and ranging system is suitable or configured for measuring a distance between the sensor and the object.

In various example embodiments, the light detection and ranging system is further suitable or configured for measuring multiple properties (i.e., multiple types of properties) of the object, such as color, roughness and temperature using multiple wavelengths emitted by the light source for measurement.

The optical remote sensing system according to various example embodiments advantageously overcomes various shortcomings associated with conventional optical remote sensing systems, such as much of the shortcomings shown in FIG. 4, and in various example embodiments, all of them.

For example, the optical remote sensing system according to various example embodiments may be advantageous over conventional optical remote sensing systems, in one or more of the following aspects:

captures any desired sub-section of the entire FoV (including an entire FoV);
captures an entire depth of field (up to the measurement range of the sensor);
uniform 3D scan across all directions is possible;
distortion free isometric reading;
combines depth, color, temperature, and other desired parameters without a requirement for calibration;
no sensitivity to vibration;
causes no vibration;
probe's lifetime is not affected by moisture or sunlight;

high scan rate;

very cost effective due to the negligible price of the optical fiber, and incorporation of one pair of the light source and emitter to scan the entire FoV;

very high resolution, since the optical fiber diameter is in the scale of multiples of 100 microns, many fibers can be mounted and therefore, many points can be captured in one complete scan;

It will be appreciated that the optical remote sensing system disclosed according to various embodiments of the present invention has a variety of applications, such as but not limited to, smart mobility, mobile robotics, ariel robotics, mobile devices (e.g., smart phones, tablets, and laptops), aerospace, detection of presence of objects and persons without invading privacy concerns, driverless and driver-assisted autonomous cars, autonomous detection and recognition of objects, and autonomous recognition of places.

Recently, the emerge of smart mobility has created a huge market for LiDAR systems. However, existing LiDAR systems are not specifically made for smart mobility purpose. Therefore, the existing LiDAR systems are confronted by significant shortcomings for this specific application since they are all designed based on a centralized point for projection and collection of the light beam. In this regard, according to various example embodiments, distributed LiDAR across the surface is provided, which seeks to address the shortcomings of the existing LiDAR systems. For example, the distributed LiDAR according to various example embodiments may be applied to any mobility or moving apparatus that needs to be aware of the distance from the surrounding objects, such as but not limited to, smart mobility.

Various example embodiments note that existing LiDAR technologies suffer from FoV limitations. Accordingly, in various example embodiments, an optical remote sensing system based on fiber optic probe is provided, which for example is capable of capturing an entire FoV. Having an entire FoV for visual perception is advantageous, for example, an application is for the incorporation of the holistic point cloud, such as disclosed in Singapore patent application no. 10201900929R (the content of which being hereby incorporated by reference in its entirety for all purposes), and a case study of such is described in Mihankhah et al., "Identification of Zones and Snapshots Through Sequence Analysis", in 14*th International Conference on Control, Automation, Robotics and Vision (ICARCV)*, 2016, pages 1-6 (the content of which being hereby incorporated by reference in its entirety for all purposes). FIG. 10 shows a table comparing various LiDAR technologies with emphasis on the limitation of the FoV.

Figure 11:
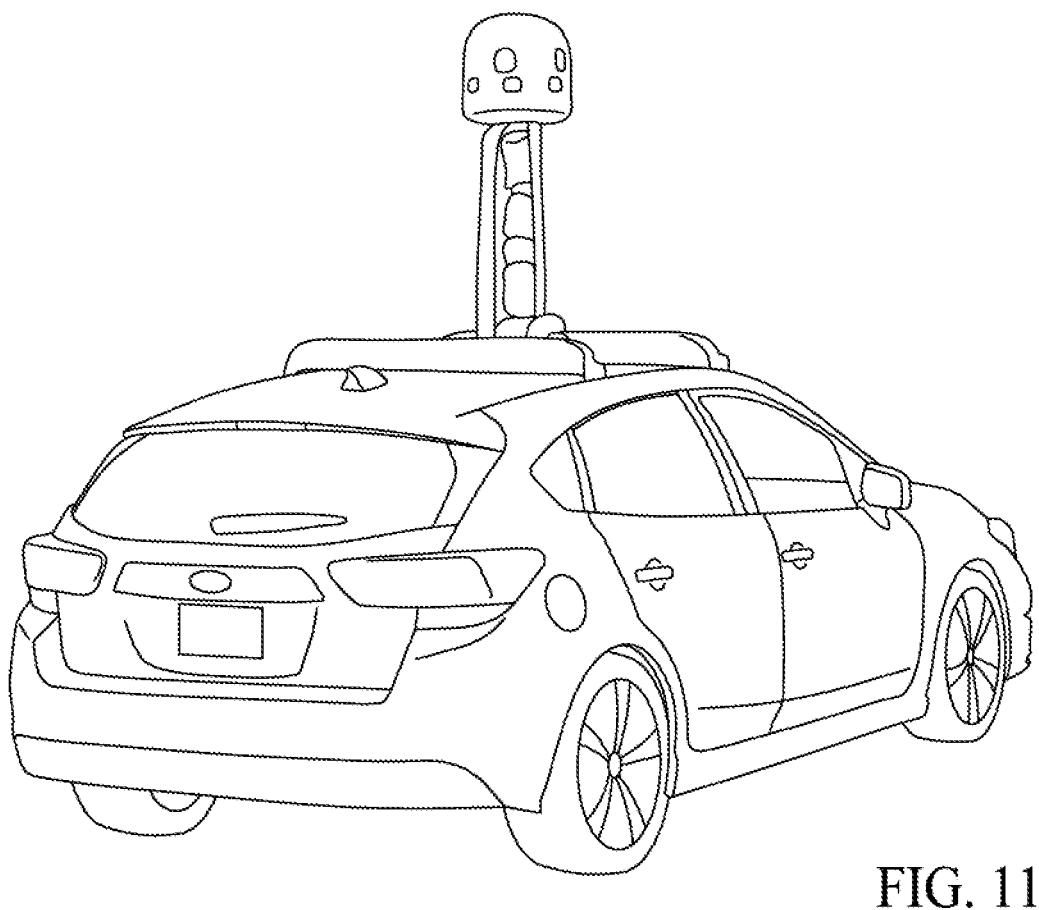
FIG. 11 shows a picture of an existing LiDAR technology, whereby the sensor probe may be mounted high on top of a moving platform but the FoV of the sensor probe is still occluded by the body of the moving platform.
Figure 12:
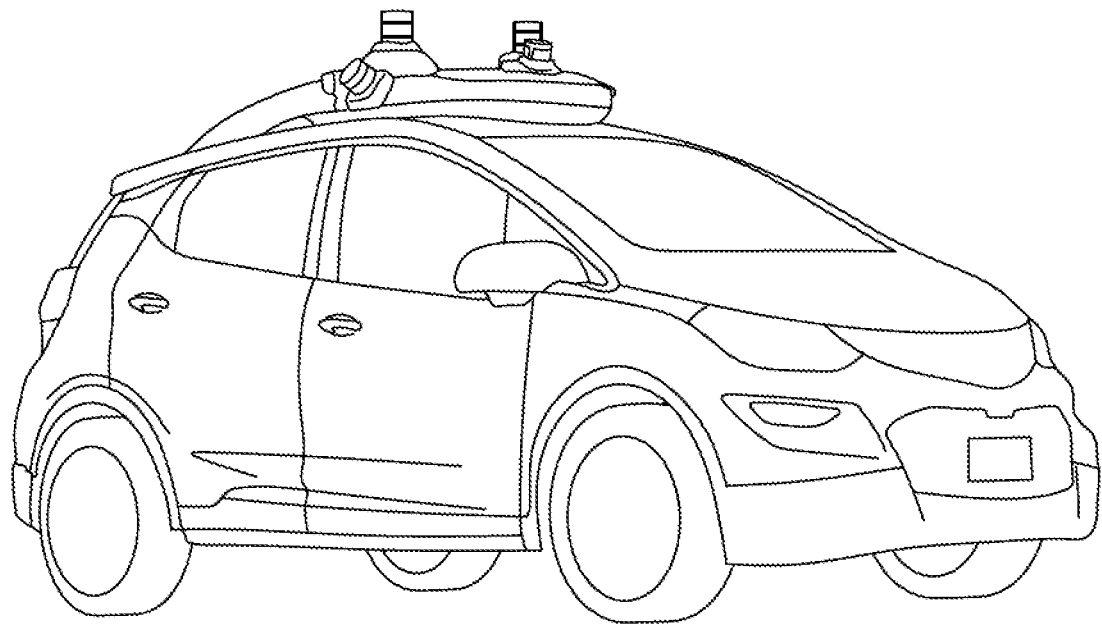
FIG. 12 shows a picture an existing LiDAR technology, whereby multiple sensors may be mounted around a moving platform.

For example, existing LiDAR technologies get occluded by the body of a moving platform. To mitigate this, in existing LiDAR technologies, the sensor probe may be mounted high on top of a vehicle, such as shown in FIG. 11 whereby the sensor suite utilized gets occluded by the body of the moving platform, which may not be desirable. This issue is not specific to conventional "LiDAR through fiber optic" technology. In general, all the existing LiDAR sensors that cover the entire Azimuth axis are confronted with the same limitation. This means that any equipment mounted on the moving platform can be a source of occlusion for the LiDAR sensor, unless it is hidden out of the FoV of the sensor. To mitigate this issue, multiple sensors may be mounted around the moving platform which is costly, bulky, visually unpleasant, and introduces calibration challenges, such as illustrated in FIG. 12.

Although the LiDAR through a single fiber optic probe can be extended across the entire FoV, if it is mounted on such a platform, similar to other sensors, the body of the moving object remains the subject of occlusion from the sensor's perspective.

According to various example embodiments, there is provided an optical remote sensing system (e.g., corresponding to the optical remote sensing system 100 described hereinbefore according to various embodiments) based on the "LiDAR through fiber optic" technology, as described hereinbefore, to distribute the sensing endpoints (e.g., corresponding to the plurality of sensor portions 120 described hereinbefore according to various embodiments) across the body of a mobile platform (e.g., driverless car, unmanned aerial vehicle (UAV), industrial manipulator, and so on). In various example embodiments, the sensing endpoints may be placed in such way that most of the body of the moving platform is covered by the LiDAR sensing endpoints (probes). This way, the entire surrounding of the moving platform may be covered by the LiDAR sensing endpoints.

Figure 13:
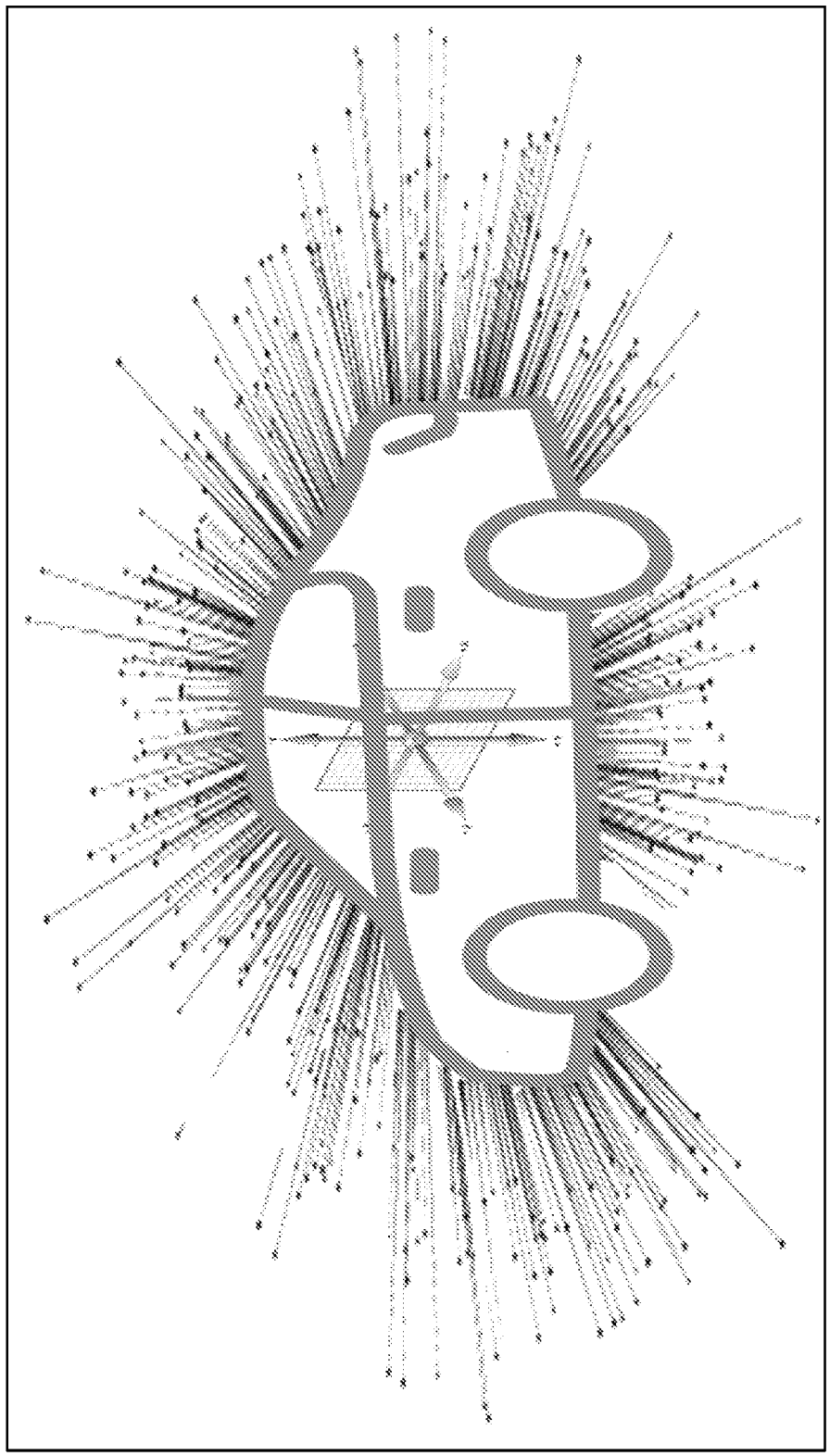
FIG. 13 depicts a schematic drawing of an optical remote sensing system based on LiDAR, according to various example embodiments of the present invention, implemented in a moving platform and having an entire FoV about the moving platform.

According to various example embodiments, the sensor portions (the sensing endpoints or probes) may be distributed across the surface of a mobile platform. Assuming a predetermined point inside the vehicle as the origin of axis, according to various example embodiments, the orientation of each sensor portion on the surface of the mobile platform may be configured to be outwards, and along the radius of the sphere that is centered at the predetermined point. For example, in the same or similar manner as described hereinbefore with reference to FIG. 7 or FIG. 8, sensor portions may be distributed across the surface of the mobile platform, such as schematically illustrated in FIG. 13, so the optical remote sensing system does not get occluded by the body of the moving platform. Accordingly, the optical remote sensing system according to various example embodiments can have an extreme resolution, and may also have uniform resolution across the surface.

Accordingly, the optical remote sensing system according to various example embodiments may also be applied to various types of object to cover an entire FoV of the object, such as but not limited to, an unmanned aerial vehicle (UAW s base, an industrial robotic arm, a mobile manipulator, and so on.

Accordingly, the optical remote sensing system (based on distributed LiDAR) according to various example embodiments advantageously address various problems associated with a single centralized LiDAR which may get occluded by the body of the moving platform, for example, in one or more of the following aspects:

captures an entire FoV;

does not get occluded by the body of the mobile platform;

uniform or adjusted scan across all directions;

no sensitivity to vibration;

causes no vibration;

very cost effective due to the negligible price of the optical fiber;

highly eye safe at all distances; and very high resolution, since the optical fiber diameter is in the scale of multiples of 100 microns, many fibers can be mounted and therefore, many points can be captured in a single scan.

It will be appreciated by a person skilled in the art that distributed LiDAR through fiber optic is one practical example of distributing LiDAR across the surface of a mobile platform, and other LiDAR technologies may also be implemented as desired or as appropriate without going beyond the scope of the present invention.

The mentioned applications such as automotive, driverless cars, UAVs, and so on, are only exemplary use cases. It will be appreciated by a person skilled in the art that the optical remote sensing system may be applied to, for example, any mobile body or platform or mobile devices (e.g., smart phones, tablets, notebook computers and so on) which requires a visual perception system.

As described hereinbefore, fiber optic probe may be used to capture multiple types of properties (or attributes) of a surrounding scene (e.g., the environment), such as color, temperature, texture, and so on. It will be appreciated by a person skilled in the art that the above-described optical remote sensing system (based on distributed LiDAR) may also be configured to sense multiple types of properties in the same or similar manner as described hereinbefore according to various example embodiments, such as with reference to FIG. 8 or FIG. 9.

Accordingly, the optical remote sensing system according to various example embodiments has the following advantages:

LiDAR through the optical fiber, which produces flexibility in light directing;

non-mechanical LiDAR (e.g., motor-less) that captures an entire field of view in real time;

calibration free reading of multiple visual properties;

separation of sensing probes, which can be distributed across a surface of a body or platform; and the processing unit can be mounted safely within the body or platform.

Accordingly, the optical remote sensing system may advantageously be capable of handling harsh environments, such as high vibration, especially in relation to mobile platforms.

According to various example embodiments, real-time sensing is in the context of the sensing rate being close to the acceptable range for the human eye to perceive a discrete sequence of observations as continuous. The sharpness of the continuous sequence of the visual depends on the speed of changes (frame rate). For example, a typical rate may be 24 Hz. For the human eye, any rate faster than 10 Hz is still acceptably perceived as continuous. Accordingly, in various example embodiments, real-time sensing refers to sensing or update rates higher than 10 Hz.

Accordingly, various example embodiments provide an optical remote sensing system capable of capturing multiple optical properties in a surrounding scene (such as object(s) or a medium therein) with respect to an observation point (e.g., an object), in real-time, through active and passive sensing techniques, across an entire FoV or across any desired subsection of the entire FoV. For example, the optical remote sensing system may be configured to generate a multi-dimensional (3D location, color, temperature, and so on) dense point cloud data through a point-by-point scanning technique without incorporation of a motorized mechanism, and using only one emitter and one cell of photosensor for each wavelength (corresponding to each type of property) desired to be measured.

While embodiments of the present invention have been particularly shown and described with reference to specific embodiments, it should be understood by those skilled in the art that various changes in form and detail may be made therein without departing from the scope of the present invention as defined by the appended claims. The scope of the present invention is thus indicated by the appended claims and all changes which come within the meaning and range of equivalency of the claims are therefore intended to be embraced.

What is claimed is:

1. An optical remote sensing system comprising:
   an emission channel mount having mounted thereto input ends of an array of emission fiber channels;
   a beam steering device configured to scan a light beam from a light source across the input ends of the array of emission fiber channels mounted to the emission channel mount;
   a plurality of sensor portions, each sensor portion configured to be exposed to a corresponding scene and having connected thereto:
   an output end of a corresponding emission fiber channel of the array of emission fiber channels, the output end being configured to emit the light beam that propagated through the corresponding emission fiber channel towards the corresponding scene; and
   an input end of a corresponding first collection fiber channel of an array of first collection fiber channels, the input end being configured to receive a backscattered light beam with respect to the corresponding scene based on the emitted light beam from the output end of the corresponding emission fiber channel;
   a first photodetector arranged to detect the backscattered light beams that propagated through the array of first collection fiber channels for sensing a property with respect to the corresponding scenes associated with the plurality of sensor portions; and
   a fiber channel hub configured for the array of emission fiber channels and the array of first collection fiber channels to pass through,
   wherein a length of the array of first collection fiber channels located between the fiber channel hub and the first photodetector is bundled to form a first collection fiber channel bundle.

2. The optical remote sensing system according to claim 1, wherein a length of the array of emission fiber channels located between the emission fiber channel mount and the fiber channel hub is bundled to form an emission fiber channel bundle.

3. The optical remote sensing system according to claim 2, wherein:
   the fiber channel hub comprises an emission fiber channel inlet configured to receive the emission fiber channel bundle and a first collection fiber channel outlet configured to output the first collection fiber channel bundle,
   after being received by the emission fiber channel inlet, the array of emission fiber channels are unbundled and emission fiber channels thereof are correspondingly distributed to the plurality of sensor portions for connection thereto, and
   before being output from the first collection fiber channel outlet, the array of first collection fiber channels are unbundled and first collection fiber channels thereof are correspondingly distributed to the plurality of sensor portions for connection thereto.

4. The optical remote sensing system according to claim 1, wherein the plurality of sensor portions are distributed across a surface of an object such that corresponding field of views associated with the plurality of sensor portions together provide a desired field of view associated with the optical remote sensing system with respect to the object.

5. The optical remote sensing system according to claim 1, wherein the beam steering device is configured to scan the light beam from the light source across each of the input ends of the emission fiber channels in succession.

6. The optical remote sensing system according to claim 5, further comprising the light source, the light source being configured to emit the light beam having multiple wavelengths suitable for sensing multiple properties with respect to the corresponding scenes associated with the plurality of sensor portions, each wavelength thereof being suitable for sensing a corresponding property of said multiple properties with respect to the corresponding scenes associated with the plurality of sensor portions.

7. The optical remote sensing system according to claim 6, wherein:
the array of first collection fiber channels is configured to receive the backscattered light beams having a wavelength corresponding to one of the multiple wavelengths of the emitted light beam,
the optical remote sensing system further comprises one or more arrays of second collection fiber channels for remaining one or more of said multiple wavelengths of the emitted light beam, respectively, each array of second collection fiber channels being configured to receive backscattered light beams having a wavelength corresponding to the corresponding remaining wavelength of said multiple wavelengths of the emitted light beam, and
each of the plurality of sensor portions further having connected thereto an input end of a corresponding second collection fiber channel of said each array of second collection fiber channels.

8. The optical remote sensing system according to claim 7, further comprising a second photodetector for said each array of second collection fiber channels, each second photodetector being arranged to detect the backscattered light beams that propagated through the corresponding array of second collection fiber channels for sensing said corresponding property of said multiple properties with respect to the corresponding scenes associated with the plurality of sensor portions.

9. The optical remote sensing system according to claim 8, wherein said each array of second collection fiber channels is configured to pass through the fiber channel hub, and for said each array of second collection fiber channels, a length of the array of second collection fiber channels located between the fiber channel hub and the corresponding second photodetector is bundled to form a second collection fiber channel bundle.

10. The optical remote sensing system according to claim 7, further comprising one or more arrays of third collection fiber channels, each array of third collection fiber channels being configured to receive reflected or radiated light beams for sensing a corresponding additional property with respect to the corresponding scenes associated with the plurality of sensor portions, wherein each of the plurality of sensor portions further having connected thereto an input end of a corresponding third collection fiber channel of said each array of third collection fiber channels.

11. The optical remote sensing system according to claim 10, further comprising a third photodetector for said each array of third collection fiber channels, each third photodetector being arranged to detect the reflected or radiated light beams that propagated through the corresponding array of third collection fiber channels for sensing the corresponding additional property with respect to the corresponding scenes associated with the plurality of sensor portions.

12. The optical remote sensing system according to claim 10, wherein each array of third collection fiber channels is configured to pass through the fiber channel hub, and for said each array of third collection fiber channels, a length of the array of third collection fiber channels located between the fiber channel hub and the corresponding third photodetector is bundled to form a third collection fiber channel bundle.

13. The optical remote sensing system according to claim 10, wherein said property comprises distance information, and the optical remote sensing system further comprises a sensed information processing module configured to generate a point cloud data based on said distance information detected by the first photodetector with respect to the corresponding scenes associated with the plurality of sensor portions, and associate each data point in the point cloud data with the corresponding additional property corresponding to the data point detected by the third photodetector for said each array of third collection fiber channels with respect to the corresponding scenes associated with the plurality of sensor portions.

14. The optical remote sensing system according to claim 5, wherein said property comprises distance information, and the optical remote sensing system further comprises a sensed information processing module configured to generate a point cloud data based on said distance information detected by the first photodetector with respect to the corresponding scenes associated with the plurality of sensor portions.

15. The optical remote sensing system according to claim 1, wherein the emission channel mount comprises an enclosure having at least a partially spherical shape, and the input ends of the array of emission fiber channels are mounted through the enclosure so as to be exposed from an inner side of the enclosure.

16. A method of optical remote sensing, using an optical remote sensing system comprising:
an emission channel mount having mounted thereto input ends of an array of emission fiber channels;
a beam steering device configured to scan a light beam from a light source across the input ends of the array of emission fiber channels mounted to the emission channel mount;
a plurality of sensor portions, each sensor portion configured to be exposed to a corresponding scene and having connected thereto:
an output end of a corresponding emission fiber channel of the array of emission fiber channels, the output end being configured to emit the light beam that propagated through the corresponding emission fiber channel towards the corresponding scene; and
an input end of a corresponding first collection fiber channel of an array of first collection fiber channels, the input end being configured to receive a backscattered light beam with respect to the corresponding scene based on the emitted light beam from the output end of the corresponding emission fiber channel;
a first photodetector arranged to detect the backscattered light beams that propagated through the array of first collection fiber channels for sensing a property with respect to the corresponding scenes associated with the plurality of sensor portions; and
a fiber channel hub configured for the array of emission fiber channels and the array of first collection fiber channels to pass through,
wherein a length of the array of first collection fiber channels located between the fiber channel hub and the first photodetector is bundled to form a first collection fiber channel bundle, the method comprising:
- scanning, by the beam steering device, a light beam from the light source across the input ends of the array of emission fiber channels mounted to the emission channel mount;
- emitting, from the output ends of the array of emission fiber channels, the light beams that propagated through the array of emission fiber channels toward the corresponding scenes, respectively;
- receiving, via the input ends of the array of first collection fiber channels, backscattered light beams with respect to the corresponding scenes based on the emitted light beams from the output ends of the array of emission fiber channels, respectively; and
- detecting, by the first photodetector, the backscattered light beams that propagated through the array of first collection fiber channels for sensing a property with respect to the corresponding scenes associated with the plurality of sensor portions.

17. The method of optical remote sensing according to claim 16, wherein said scanning the light beam comprises scanning the light beam from the light source across each of the input ends of the array of emission fiber channels in succession.

18. The method of optical remote sensing according to claim 16, wherein the light beam emitted from the light source has a wavelength suitable for sensing said property with respect to the corresponding scenes, said property comprises distance information, physical property information or state information.

19. The method of optical remote sensing according to claim 18, wherein said property comprises said distance information, and the method further comprises generating a point cloud data based on said distance information detected by the first photodetector with respect to the corresponding scenes associated with the plurality of sensor portions.

20. A method of forming an optical remote sensing system, the method comprising:
- providing an emission channel mount having mounted thereto input ends of an array of emission fiber channels;
- providing a beam steering device configured to scan a light beam from a light source across the input ends of the array of emission fiber channels mounted to the emission channel mount;
- providing a plurality of sensor portions, each sensor portion configured to be exposed to a corresponding scene and having connected thereto:
    - an output end of a corresponding emission fiber channel of the array of emission fiber channels, the output end being configured to emit the light beam that propagated through the corresponding emission fiber channel towards the corresponding scene; and
    - an input end of a corresponding first collection fiber channel of an array of first collection fiber channels, the input end being configured to receive a backscattered light beam with respect to the corresponding scene based on the emitted light beam from the output end of the corresponding emission fiber channel;
- providing a first photodetector arranged to detect the backscattered light beams that propagated through the array of first collection fiber channels for sensing a property with respect to the corresponding scenes associated with the plurality of sensor portions; and
- providing a fiber channel hub configured for the array of emission fiber channels and the array of first collection fiber channels to pass through,
- wherein a length of the array of first collection fiber channels located between the fiber channel hub and the first photodetector is bundled to form a first collection fiber channel bundle.

* * * * *